(12) United States Patent
Handa et al.

(10) Patent No.: US 10,836,257 B2
(45) Date of Patent: Nov. 17, 2020

(54) CONTROL APPARATUS AND CONTROL SYSTEM INCLUDING THE SAME

(71) Applicant: DENSO CORPORATION, Kariya (JP)

(72) Inventors: Yuichi Handa, Kariya (JP); Kimikazu Nakamura, Kariya (JP); Seiji Iyasu, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/553,574

(22) Filed: Aug. 28, 2019

(65) Prior Publication Data

US 2020/0007040 A1    Jan. 2, 2020

Related U.S. Application Data

(63) Continuation of application No. PCT/JP2018/006567, filed on Feb. 22, 2018.

(30) Foreign Application Priority Data

Feb. 28, 2017 (JP) ................................ 2017-037536
Feb. 28, 2017 (JP) ................................ 2017-037538

(51) Int. Cl.
  *H02M 7/48*      (2007.01)
  *B60L 1/00*      (2006.01)
  (Continued)

(52) U.S. Cl.
  CPC ............. *B60L 1/00* (2013.01); *B60L 3/003* (2013.01); *B60L 50/10* (2019.02); *B60L 50/60* (2019.02);
  (Continued)

(58) Field of Classification Search
  CPC . H02M 2001/0012; H02M 2001/0009; H02M 2001/385; H02M 2003/1566;
  (Continued)

(56) References Cited

U.S. PATENT DOCUMENTS

2012/0187759 A1    7/2012  Kamichi et al.
2016/0369534 A1*  12/2016  Tabata ............... G07C 9/00944
2017/0361716 A1*  12/2017  Sato ...................... B60L 3/0092

FOREIGN PATENT DOCUMENTS

EP         1120880 A2    8/2001
JP      2001-268787 A    9/2001
(Continued)

OTHER PUBLICATIONS

May 22, 2018 International Search Report issued in International Application No. PCT/JP2018/006567.

*Primary Examiner* — Bryan R Perez
(74) *Attorney, Agent, or Firm* — Oliff PLC

(57) ABSTRACT

A control apparatus includes: an operation prediction section that predicts that equipment will shift from an operation stopped state to an operating state; and a supply control section that, if it is not predicted that the equipment will shift from the operation stopped state to the operating state, sets a main-electrical power conversion device to the operation stopped state and operates an auxiliary-electrical power conversion device to supply electrical power from the auxiliary-electrical power conversion device to the equipment, and that, if it is predicted that the equipment will shift from the operation stopped state to the operating state, operates the main-electrical power conversion device to supply power from the main-electrical power conversion device to the equipment. Power conversion efficiency of the auxiliary-electrical power conversion device is higher than that of the main-electrical power conversion device within a load current range corresponding to a dark current flowing through the equipment.

23 Claims, 10 Drawing Sheets

(51) Int. Cl.
*B60L 50/10* (2019.01)
*B60L 3/00* (2019.01)
*B60W 10/26* (2006.01)
*H02M 3/335* (2006.01)
*B60L 50/60* (2019.01)
*B60L 58/14* (2019.01)

(52) U.S. Cl.
CPC ............. *B60L 58/14* (2019.02); *B60W 10/26* (2013.01); *H02M 3/33507* (2013.01); *H02M 7/48* (2013.01)

(58) Field of Classification Search
CPC ......... H02M 2003/1557; H02M 3/156; H02M 3/158; H02M 3/1588; H02M 3/155; H02M 3/1582; H02M 3/157; H02M 3/1563; H02M 3/1584; H02M 3/33507; H02M 7/48; H02M 7/797; H04B 2215/069; B60L 1/00; B60L 50/60; B60L 50/10; B60L 50/15; B60L 58/14; B60L 58/18; B60L 58/20; B60L 3/003; B60L 15/2045; B60L 2260/54; B60L 2260/50; B60L 2260/58; B60W 10/26; B60R 16/03; Y02T 10/7005; Y02T 10/7241; Y02T 10/7022; Y02T 10/92; H02J 7/00; H02J 7/34

See application file for complete search history.

(56) References Cited

FOREIGN PATENT DOCUMENTS

| | | |
|---|---|---|
| JP | 2004-201389 A | 7/2004 |
| JP | 2008-005622 A | 1/2008 |
| JP | 2012-130092 A | 7/2012 |
| JP | 2016-163526 A | 9/2016 |
| JP | 2016-213975 A | 12/2016 |

* cited by examiner

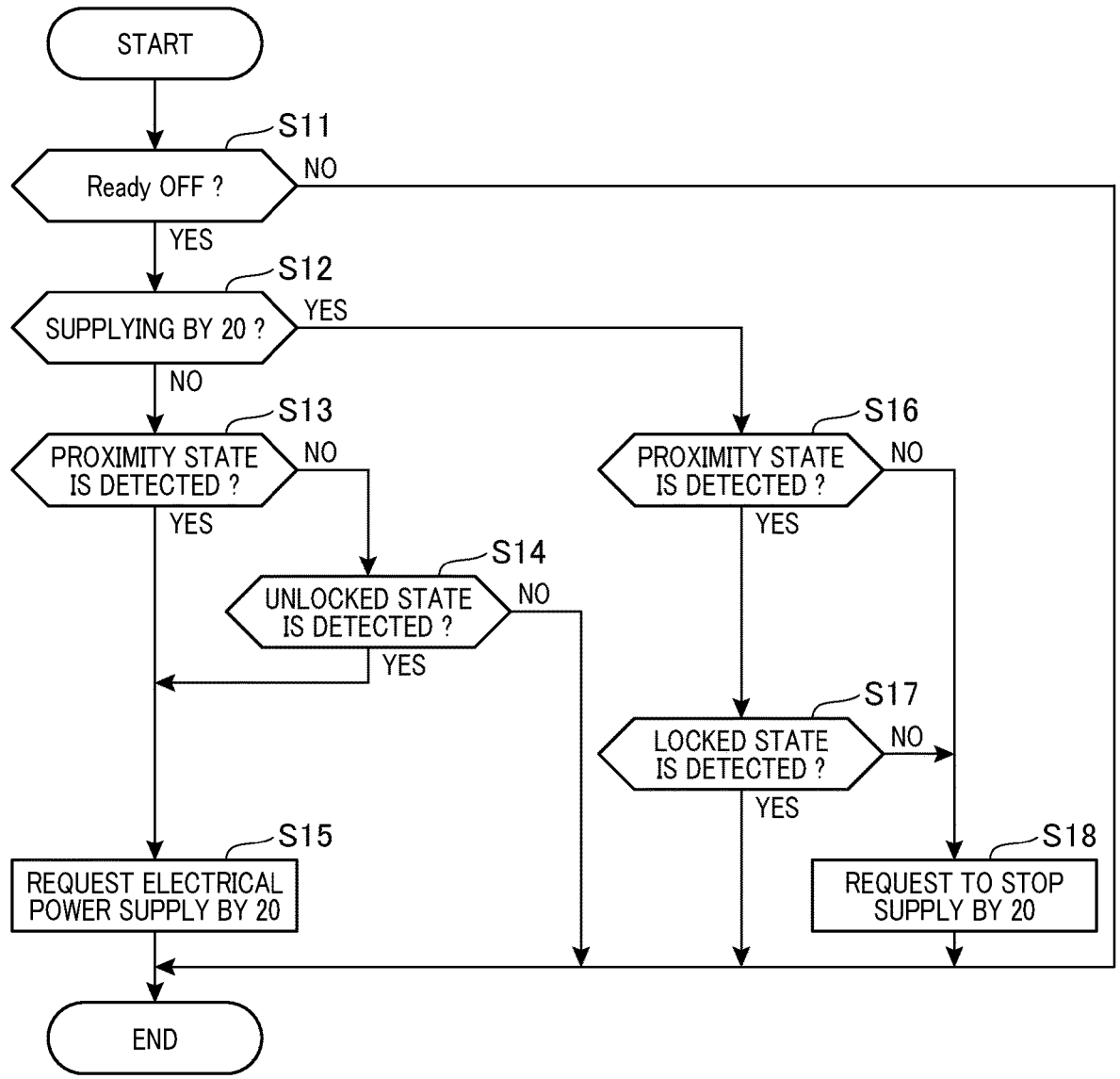

CONTROL APPARATUS AND CONTROL SYSTEM INCLUDING THE SAME

CROSS-REFERENCE TO RELATED APPLICATION

The present application is based on and claims the benefit of priority from earlier Japanese Patent Application No. 2017-037536 and No. 2017-037538 filed on Feb. 28, 2017, the descriptions of which are incorporated herein by reference.

BACKGROUND

Technical Field

The present disclosure relates to a control apparatus applied to a power supply system and a control system including the control apparatus and the power supply system.

Related Art

A power supply system includes a main electrical storage device and a main electrical power conversion device decreasing output voltage of the main electrical storage device. The power supply system is connected with a plurality of pieces of equipment. Electrical power is supplied from the main electrical power conversion device to the equipment.

SUMMARY

One aspect of the present disclosure is a control apparatus that is applied to a power supply system including a main electrical storage device, a main electrical power conversion device that decreases output voltage of the main electrical storage device to supply the decreased output voltage to equipment, an auxiliary electrical storage device that is electrically connected with the main electrical power conversion device and the equipment and supplies electrical power to the equipment, and an auxiliary electrical power conversion device that decreases output voltage of the main electrical storage device and supplies the decreased output voltage to the equipment.

The control apparatus includes:

an operation prediction section that predicts that the equipment will shift from an operation stopped state to an operating state; and a supply control section that, if it is not predicted that the equipment will shift from the operation stopped state to the operating state, sets the main electrical power conversion device to the operation stopped state and operates the auxiliary electrical power conversion device to supply electrical power from the auxiliary electrical power conversion device to the equipment, and that, if it is predicted that the equipment will shift from the operation stopped state to the operating state, operates the main electrical power conversion device to supply electrical power from the main electrical power conversion device to the equipment.

Power conversion efficiency of the auxiliary electrical power conversion device is higher than power conversion efficiency of the main electrical power conversion device within a load current range corresponding to a dark current flowing through the equipment.

BRIEF DESCRIPTION OF THE DRAWINGS

In the accompanying drawings:

FIG. 2 is a table illustrating states of a vehicle;

FIG. 3 is a flowchart illustrating electrical power supply control performed by a verification ECU;

DETAILED DESCRIPTION OF THE PREFERRED EMBODIMENTS

JP-A-2008-5622 discloses a power supply system that includes a main electrical storage device and a main electrical power conversion device decreasing output voltage of the main electrical storage device. The power supply system is connected with a plurality of pieces of equipment. Electrical power is supplied from the main electrical power conversion device to the equipment.

In the power supply system, when electrical power is supplied from the main electrical power conversion device to the equipment, the main electrical power conversion device consumes electrical power for operation thereof. Hence, due to the electric power consumption for operation of the main electrical power conversion device, power conversion efficiency of the whole power supply system may decrease.

The present disclosure has been made in view of the above problem, and an object thereof is to provide a control apparatus appropriately suppresses decrease in power conversion efficiency in a power supply system and a control system including the control apparatus and a power supply system.

First Embodiment

Figure 1:
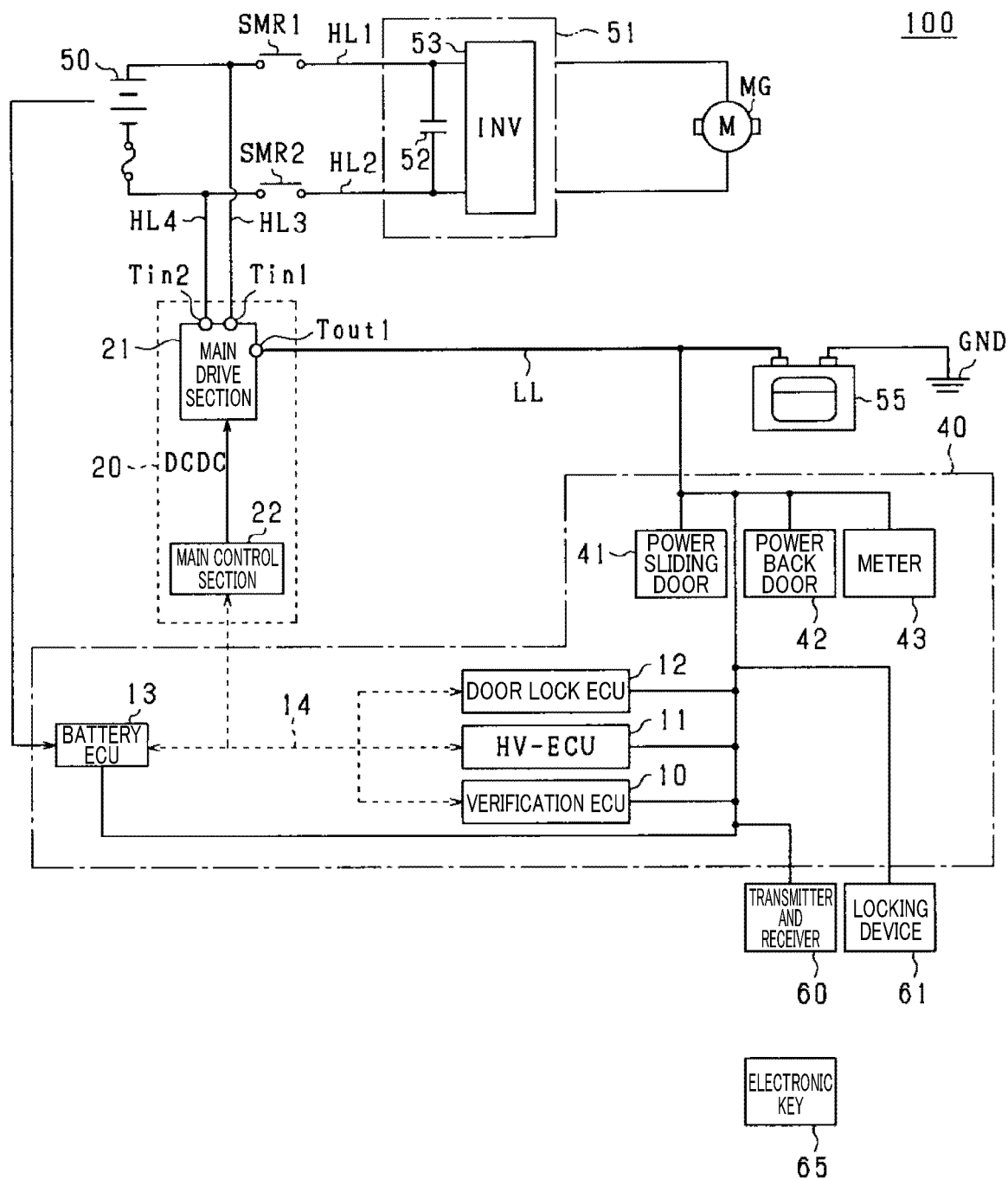
FIG. 1 is a diagram showing a configuration of a power supply system according to a first embodiment.

Hereinafter, the first embodiment of the present disclosure will be described. FIG. 1 is a diagram showing a configuration of a control system 100 according to the first embodiment. The control system 100 is installed in a vehicle. In the present embodiment, the vehicle in which the control system 100 is installed is a hybrid vehicle including an engine, which is an internal-combustion engine, and a traction motor as traveling power sources. Specifically, the vehicle is a PHV (Plug-in Hybrid Vehicle).

The control system 100 includes a first storage battery 50 corresponding to a main electrical storage device, a second storage battery 55 corresponding to an auxiliary electrical storage device, first equipment 40, second equipment 51, and a main DC/DC converter 20 corresponding to a main electrical power conversion device. Hereinafter, the main DC/DC converter 20 is referred to as a main DDC. In the first embodiment, a power supply system includes the first storage battery 50, the second storage battery 55, and the main DDC 20.

The first storage battery 50 supplies electrical power required to operate the equipment 40 and 51. In the present embodiment, the first storage battery 50 is a lithium ion battery, and, for example, generates a voltage of 200 to 400 V across terminals.

The second equipment 51 includes an input capacitor 52, an inverter 53 that converts DC voltage supplied from the first storage battery 50 to AC voltage. The input side of the inverter 53 is connected to a first high-voltage line HL1 connected to a positive terminal of the first storage battery 50 and a second high-voltage line HL2 connected to a negative terminal of the first storage battery 50. The input capacitor 52 is connected to the inverter 53 in parallel between the first high-voltage line HL1 and the second high-voltage line HL2. In the present embodiment, the high-voltage lines HL1 to HL4 correspond to main electrical power supply lines.

The output side of the inverter 53 is connected to a traction motor MG. The traction motor MG is driven by the AC voltage converted by the inverter 53. The inverter 53 includes a rectification function of rectifying AC current to DC current. When the vehicle is braking, the inverter 53 rectifies AC current output from the traction motor MG by regenerative power generation to DC current. The rectified current is supplied to the first storage battery 50 through the high-voltage lines HL1 and HL2, thereby charging the first storage battery 50.

The first high-voltage line HL1 is provided with a first relay SMR1, and the second high-voltage line HL1 is provided with a second relay SMR2. When the relays SMR1 and SMR2 are controlled to be in closed states, the first storage battery 50 and the inverter 53 are electrically connected. Hence, electrical power can be supplied from the first storage battery 50 to the inverter 53. In contrast, when the relays SMR1 and SMR2 are controlled to be in opened states, the first storage battery 50 and the inverter 53 are electrically disconnected. The relays SMR1 and SMR2 correspond to a switching section.

The main DDC 20 is a voltage step down converter and includes a main drive section 21 that decreases DC voltage supplied from the first storage battery 50 and a main control section 22 that controls operation of the main drive section 21.

The main drive section 21 includes a plurality of semiconductor switches, and switches the semiconductor switches between on states and off states to decrease input voltage supplied from the first storage battery 50 and output the decreased voltage. A first input terminal Tin1 of the main drive section 21 is connected to the third high-voltage line HL3 connected to the first high-voltage line HL1. A second input terminal Tin2 is connected to the fourth high-voltage line HL4 connected to the second high-voltage line HL2. A first output terminal Tout1 of the main drive section 21 is connected to a low-voltage line LL.

In the present embodiment, the third high-voltage line HL3 is connected to the first high-voltage line HL1 at a position nearer to the first storage battery 50 than the first relay SMR1 is. The fourth high-voltage line HL4 is connected to the second high-voltage line HL2 at a position nearer to the first storage battery 50 than the second relay SMR2 is. Hence, even when the relays SMR1 and SMR2 are controlled to be in opened states, the first storage battery 50 and the main DDC 20 are continuously electrically connected.

The main control section 22 drives the semiconductor switches of the main drive section 21. The main control section 22 controls a duty ratio, which is a ratio of an on period to one switching period of the semiconductor switches, to control output voltage of the main drive section 21 to be an output voltage command value. The control of the duty ratio by the main control section 22 changes a voltage value output to the low-voltage line LL through the first output terminal Tout1 of the main drive section 21.

The low-voltage line LL is connected to the second storage battery 55. A positive terminal of the second storage battery 55 is connected to the low-voltage line LL, and a negative terminal of the second storage battery 55 is connected to a ground line GND. Hence, at least one of output voltage of the main DDC 20 and output voltage of the second storage battery 55 is applied to the low-voltage line LL. The low-voltage line LL corresponds to an auxiliary electrical power supply line.

In the present embodiment, storage capacity of the second storage battery 55 is less than storage capacity of the first storage battery 50. Voltage across terminals of the second storage battery 55 is lower than voltage across terminals of the first storage battery 50. For example, the voltage across the terminals of the second storage battery 55 is 12 V.

The low-voltage line LL is connected with the first equipment 40 to which electrical power is supplied through the low-voltage line LL. In the present embodiment, the first equipment 40 includes a power sliding door 41, a power back door 42, and a meter 43, as main parts. Rated voltages of the power sliding door 41, the power back door 42, and the meter 43 are lower than a rated voltage of the second equipment 51.

The power sliding door 41 includes a sliding door of the vehicle, a door motor functioning as a driving source for sliding the sliding door. Drive of the door motor slides the sliding door in the longitudinal direction of the vehicle. The power back door 42 includes a rear gate, a back door motor functioning as a driving source for operating the rear gate. Drive of the back door motor opens and closes the rear gate. The meter 43 displays a vehicle speed, which corresponds to a rotation speed of the engine or the traction motor MG1, and a display.

The first equipment 40 includes a verification ECU 10, an HV-ECU 11, a door lock ECU 12, and a battery ECU 13. The ECUs 10 to 13 are supplied with electrical power through the low-voltage line LL. The ECU 10 to 13 are connected via an in-vehicle network interface 14 so as to be able to communicate with each other. As the in-vehicle network interface 14, well-known interfaces such as CAN (Controller Area Network) and LIN (Local Interconnect Network) can be used. Hereinafter, the in-vehicle network interface 14 is referred to as an in-vehicle NIF 14.

The verification ECU 10 performs intercommunication with an electronic key 65 serving as a portable device carried by a user to perform a verification process for the electronic key 65. The verification ECU 10 is connected via a transmitter and receiver 60 for detecting the electronic key 65 located in the vehicle interior or within a predetermined distance from the vehicle, and the in-vehicle NIF 14. When a request signal for performing the verification process is transmitted from the verification ECU 10 to the transmitter and receiver 60, the transmitter and receiver 60 forms a detection area of the electronic key based on the request signal. The detection area is formed both in the vehicle interior and outside the vehicle interior. When the electronic key 65 enters the detection area, the electronic key 65 transmits transmission waves to the transmitter and receiver 60. The transmission waves received by the transmitter and receiver 60 are converted to a digital signal, which is then output to the verification ECU 10 through the in-vehicle NIF 14. The verification ECU 10 verifies an ID code included in the digital signal. A unique number is assigned to the ID code for each vehicle. As a result of the verification, if the number of the ID code is an appropriate number, the verification ECU 10 notifies the ECUs 10 to 13 of establishment of the verification through the in-vehicle NIF 14.

When the user carrying the electronic key 65 enters the detection area, since the transmission waves can be received from the electronic key 65, the verification ECU 10 can detect a state where the distance between the user and the vehicle has become a predetermined distance or less. When the user carrying the electronic key 65 is outside the detection area, since the transmission waves cannot be received from the electronic key 65, the verification ECU 10 can detect a state where the distance between the user and the vehicle has become more than the predetermined distance.

The verification of the electronic key 65 by the verification ECU 10 is performed, when the user carrying the electronic key 65 is close to the vehicle and has operated a push SW. The push SW shifts, according to operation by the use, a state of power activation in order of states of ignition off (IGOFF), accessories on (ACCON), and ignition on (IGON).

IGOFF is a state of power activation in which both the relay SMRs 1 and 2 are in opened states, and an AC relay, not shown, is in an opened state. ACCON is a state of power activation in which the AC relay is shifted from an opened state to a closed state, so that electrical power is supplied from the second storage battery 55 to equipment other than the first equipment 40 and the second equipment 51. IGON is a state of power activation in which a request for shifting the relay SMRs 1 and 2 from opened states to closed states.

The door lock ECU 12 switches vehicle doors between locked states and unlocked states. In the verification process performed when the user is closed to the vehicle, if the verification ECU 10 establishes the verification, the door lock ECU 12 transmits an un-locking signal through the in-vehicle NIF 14. In accordance with the un-locking signal, a locking device 61 switches the vehicle from a locked state to an unlocked state. In the unlocked state, the sliding door or the rear gate of the vehicle is unlocked. The door lock ECU 12 can transmit a door state signal indicating whether the vehicle doors are in locked states or unlocked states to the verification ECU 10 through the in-vehicle NIF 14.

The HV-ECU 11 switches the relay SMRs 1 and 2 from opened states to closed states, so that electrical power can be supplied from the first storage battery 50 to the traction motor MG through the second equipment 51. In the present embodiment, when the state of power activation of the vehicle is IGON, and the use has operated the brake, the HV-ECU 11 switches the relay SMRs 1 and 2 from opened states to closed states.

When the state of power activation of the vehicle is ReadyON, the HV-ECU 11 calculates command torque required for driving the traction motor MG1 according to an amount of operation of the accelerator by the user. The HV-ECU 11 controls the inverter 53 to adjust torque of the traction motor MG to the command torque.

The battery ECU 13 calculates remaining capacity of the first storage battery 50 as a first remaining capacity SOC1 (SOC: State Of Charge) based on various pieces of information of the first storage battery 50 and the second storage battery 55, and calculates remaining capacity of the second storage battery 55 as a second remaining capacity SOC2. In the present embodiment, the battery ECU 13 calculates the first and second remaining capacities SOC1 and SOC2 from output currents, output voltages, and temperatures of the first storage battery 50 and the second storage battery 55.

Next, a change of the state of power activation of the vehicle will be described with reference to FIG. 2. When both the relay SMRs 1 and 2 are controlled to be in opened states, the state of power activation of the vehicle is ReadyOFF indicating a state where the vehicle cannot run. Hence, electrical power is not supplied from the first storage battery 50 to the second equipment 51. Even when the user operates the push SW to shift the state of power activation of the vehicle from IGOFF to ACC and further to IGON, the relay SMRs 1 and 2 are kept in opened states. In this ReadyOFF, electrical power is supplied to the first equipment 40, and the first equipment 40 is in a standby state.

In the standby state, minimum electrical power is supplied to the first equipment 40. The current flowing to the first equipment 40 in the standby state is referred to as a dark current. In the present embodiment, the standby state corresponds to an operation stopped state of the first equipment 40. In the main DDC 20, in the standby state, the semiconductor switches of the main drive section 21 are not operated, and electrical power is not supplied to the first equipment 40. The maximum electrical power that can be output from the main DDC 20 (e.g., hundreds of watts to thousands of watts) is larger than the maximum required electrical power of the first equipment 40 in the standby state (e.g., 1 W or less).

When the state of the vehicle is IGON, braking operation by the user changes the state of the vehicle to ReadyON indicating a travelable state. In this ReadyON, both the relays SMR1 and SMR2 are controlled to be in closed states, and electrical power is supplied from the first storage battery 50 to the second equipment 51.

In the standby state of first equipment 40, since a current (dark current) flowing to the first equipment 40 is kept in a value lower than that in an operating state, output current in the standby state is lower than output current in the operating state. As a result, power conversion efficiency of the main DDC 20 in the standby state of the first equipment 40 is lower than power conversion efficiency in the operating state. In other words, the standby state of the first equipment 40 is a factor that lowers the power conversion efficiency of the control system 100.

Hence, in the present embodiment, in the standby state of the first equipment 40, the verification ECU 10 does not cause the main DDC 20 to supply electrical power to the first equipment 40, but causes the second storage battery 55 to supply electrical power to the first equipment 40. In addition, if it is predicted that the first equipment 40 will shift from the standby state to the operating state, the verification ECU 10 causes the main DDC 20 to supply electrical power to the first equipment 40 to ensure electrical power required for operation of the first equipment 40. Hence, the verification ECU 10 corresponds to a control apparatus.

Next, power supply control performed by the verification ECU 10 will be described with reference to the flowchart in FIG. 3. The process illustrated in the flowchart in FIG. 3 is repeatedly performed at predetermined control periods by the verification ECU 10.

In step S11, the verification ECU 10 determines whether the state of the vehicle is ReafyOFF. In the present embodiment, if the relays SMR1 and SMR2 are in opened states, the verification ECU 10 determines that the state of the vehicle is ReafyOFF. For example, the verification ECU 10 determines whether the state of the vehicle is ReafyOFF based on the notification from the HV-ECU 11 about whether the relays SMR1 and SMR2 are controlled to be opened states or closed states. If the verification ECU 10 determines that the state of the vehicle is ReafyOFF, the present control proceeds to step S12. In contrast, if the verification ECU 10 determines that the state of the vehicle is ReafyON, the process shown in FIG. 3 is temporarily halted.

In step S12, the verification ECU 10 determines presence or absence of electrical power supply from the main DDC 20 to the first equipment 40 is determined. For example, in the previous control period, if it has been determined that the first equipment 40 has shifted to an operating state, the verification ECU 10 determines that the main DDC 20 has supplied electrical power to the first equipment 40. If the verification ECU 10 determines that the main DDC 20 has not supplied electrical power to the first equipment 40, the present control proceeds to step S13.

In steps S13 and s14, the verification ECU 10 predicts that the first equipment 40 will shift from a standby state to an operating state. Steps S13, S14, S16, and S17 correspond to an operation prediction section.

In step S13, the verification ECU 10 detects a proximity state where the distance between the user carrying the electronic key 65 and the vehicle is a predetermined distance or less. Specifically, when the user carrying the electronic key 65 enters a detection area, whereby the verification ECU 10 receives transmission waves from the electronic key 65, the verification ECU 10 detects the proximity state. In contrast, when the verification ECU 10 does not receive transmission waves from the electronic key 65, the verification ECU 10 does not detect the proximity state. Alternatively, when the verification ECU 10 has received transmission waves from the electronic key 65, and the verification of the ID code is established, the verification ECU 10 may detect the proximity state. Detection of the proximity state corresponds to prediction that the first equipment 40 will shift to an operating state, whereby the present control proceeds to step S15.

In contrast, if the verification ECU 10 has not detected the proximity state, the present control proceeds to step S14. In step S14, when the user operates the electronic key 65, the verification ECU 10 detects an unlocked state of the vehicle caused by the locking device 61. Non-detection of an unlocked state of the vehicle corresponds to non-prediction that the first equipment 40 will shift to an operating state, and the process shown in FIG. 3 is temporarily halted. In contrast, detection of an unlocked state of the vehicle corresponds to prediction that the first equipment 40 will shift to an operating state, and the process proceeds to step S15.

In step S15, the verification ECU 10 issues to the main DDC 20 an equipment operation request to start electrical power supply to the first equipment 40. The equipment operation request is received by the HV-ECU 11 through the in-vehicle NIF 14. Upon receiving the equipment operation request, the HV-ECU 11 causes the main control section 22 of the main DDC 20 to start electrical power supply to the first equipment 40. Steps S15 and S18 correspond to a supply control section.

In the present embodiment, to stop electrical power supply from the second storage battery 55 to the first equipment 40, the main control section 22 sets an output voltage command value of the main DDC 20 so that output voltage of the main DDC 20 has a value (e.g. 14V) higher than a voltage across terminals of the second storage battery 55. Hence, current flows through the low-voltage line LL from the main DC/DC 20 to the second storage battery 55, and electrical power supply from the second storage battery 55 to the first equipment 40 is stopped.

In contrast, in step S12, if the verification ECU 10 determines that electrical power supply from the main DC/DC 20 to the first equipment 40 is determined, the present control proceeds to step S16. Even when it is predicted that the first equipment 40 will shift to an operating state, if thereafter, for example, the user gets out of the vehicle, the first equipment 40 is highly likely to shift to a standby state. Hence, in step S16, based on the reception state of the transmission waves of the transmitter and receiver 60, the verification ECU 10 detects a state where the distance between the electronic key 65 carried by the user and the vehicle is longer than the predetermined distance.

In step S16, if the proximity state is not detected, the verification ECU 10 predicts that the first equipment 40 will shift to a standby state, and the present control proceeds to step S18. In contrast, if the proximity state is detected, the present control proceeds to step S17. It is noted that the process in step S16 is similar to the process in step S13.

When the vehicle doors are switched from an unlocked state to a locked state, the user is highly likely to have got out of the vehicle. Hence, in step S17, the verification ECU 10 determines the probability that the user has got out of the vehicle by detecting the change from the unlocked state to the locked state. Specifically, the probability is determined based on the change of the door state signal, which is transmitted from the door lock ECU 12, from the unlocked state to the locked state. If the change to the locked state is detected, the present control proceeds to step S18. In contrast, if the change to the locked state is not detected, the process shown in FIG. 3 is temporarily halted.

In step S18, the verification ECU 10 causes the main DDC 20 to stop electrical power supply to the first equipment 40. Specifically, the verification ECU 10 transmits an operation stop request to stop electrical power supply to the main DDC 20, to the HV-ECU 11 through the in-vehicle NIF 14. Upon receiving the operation stop request, the HV-ECU 11 causes the main control section 22 of the main DDC 20 to stop electrical power supply from the main DDC 20 to the first equipment 40. Hence, only output voltage from the second storage battery 55 is applied to the low-voltage line LL. The output voltage supplies electrical power to the first equipment 40.

The present embodiment described above provides the following effects.

If the verification ECU 10 does not predict that the first equipment 40 will shift from a standby state to an operating state, the main DDC 20 is set to a standby state. Hence, electrical power is not supplied from the main DDC 20 to the first equipment 40. In this case, during a time period during which required electrical power of the first equipment 40 is low, electrical power is not supplied from the main DDC 20 to the first equipment 40. As a result, supplying electrical power from the second storage battery 55 to the first equipment 40 can suppress decrease in the power conversion efficiency of the control system 100. If the verification ECU 10 predicts that the first equipment 40 will shift from a standby state to an operating state, the verification ECU 10 operates the main DDC 20 to supply electrical power from the main DDC 20 to the first equipment 40. Hence, during a time period during which required electrical power of the first equipment 40 is high, supplying electrical power from the main DDC 20 to the first equipment 40 can prevent an electrical power shortage in the first equipment 40.

In a case where the state of the vehicle is ReadyOFF, if it is not predicted that the first equipment 40 will shift to an operating state, the verification ECU 10 does not cause the main DDC 20 to supply electrical power to the first equipment 40. In this case, decrease in power conversion efficiency of the whole control system 100 can be suppressed.

If it is detected, based on the transmission waves, that a proximity state where the distance between the electronic key 65 and the vehicle is a predetermined distance or less, the verification ECU 10 predicts that the first equipment 40 will shift to an operating state. In this case, prediction accuracy in the shift of the first equipment 40 to the operating state can be increased, and decrease in the power conversion efficiency can be appropriately suppressed.

If a state where the distance between the electronic key 65 and the vehicle is more than the predetermined distance is detected based on a state of receiving transmission waves in the transmitter and receiver 60, the verification ECU 10 predicts that the first equipment 40 will shift from an operating state to a standby state. Then, if it is predicted that the first equipment 40 will shift to a standby state, the verification ECU 10 stops electrical power supply from the main DDC 20 to the first equipment 40. In this case, predicting the shift of the first equipment 40 to a standby state based on a state of receiving transmission waves can appropriately suppress decrease in the power conversion efficiency.

If an unlocked state of the locking device 61 is detected, the verification ECU 10 predicts the shift of the first equipment 40 to an operating state. In this case, prediction accuracy in the shift of the first equipment 40 to an operating state can be increased, and decrease in the power conversion efficiency can be appropriately suppressed.

If a locked state of the locking device 61 is detected, the verification ECU 10 predicts the shift of the first equipment 40 to a standby state. In this case, predicting the shift of the first equipment 40 to an operation stopped state based on a locked state of the vehicle door by the locking device 61 can appropriately suppress decrease in the power conversion efficiency.

Second Embodiment

Hereinafter, configurations of the second embodiment different from those of the first embodiment will be mainly described. In the second embodiment, the same parts as those in the first embodiment are denoted by the same reference signs to omit redundant descriptions.

Figure 4:
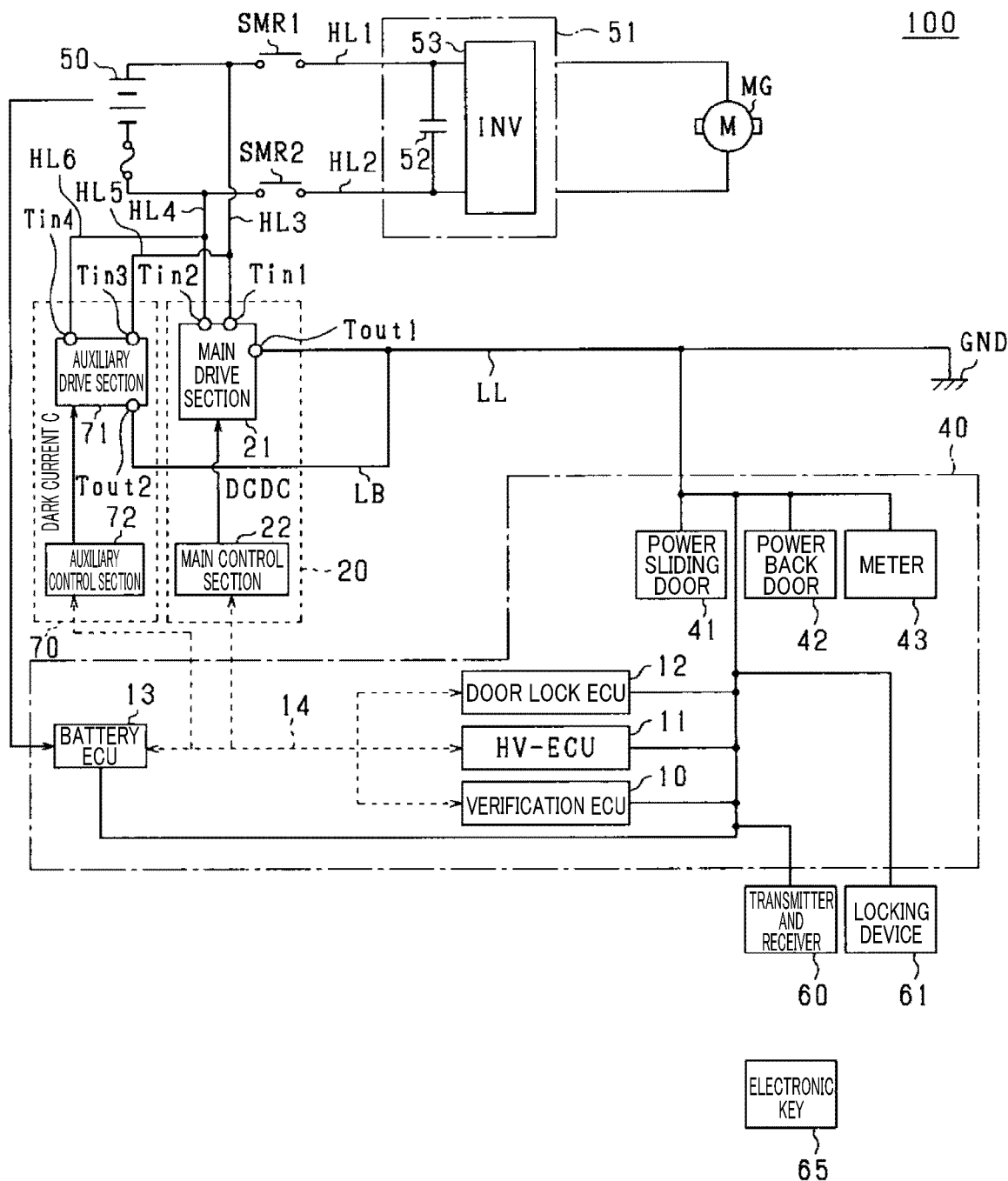
FIG. 4 is a diagram showing a configuration of a power supply system according to a second embodiment.

FIG. 4 is a diagram showing a configuration of the control system 100 according to the second embodiment. The control system 100 is installed in the vehicle.

The control system 100 includes the first storage battery 50, the first equipment 40, the second equipment 51, the main DDC 20, and a dark-current converter 70 corresponding to an auxiliary electrical power conversion device. In the present embodiment, a power supply system includes the first storage battery 50, the main DCC 20, and the dark-current converter 70.

The first storage battery 50 is electrically connected with the dark-current converter 70. The dark-current converter 70 includes an auxiliary drive section 71 that decreases output voltage from the first storage battery 50 and an auxiliary control section 72 that controls drive of the auxiliary drive section 71.

The auxiliary drive section 71 includes a plurality of semiconductor switches, and performs on-off control of the semiconductor switches to decrease input voltage supplied from the first storage battery 50. A third input terminal Tin3 of the auxiliary drive section 71 is connected to a fifth high-voltage line HL5 connected to the third high-voltage line HL3. A fourth input terminal Tin4 is connected to a sixth high-voltage line HL6 connected to the fourth high-voltage line HL4. A second output terminal Tout2 of the auxiliary drive section 71 is connected to a first end of an auxiliary line LB. A second end of the auxiliary line LB is connected to the low-voltage line LL. Hence, the auxiliary line LB electrically connects the dark-current converter 70 and the low-voltage line LL.

The auxiliary control section 72 drives the semiconductor switches of the auxiliary drive section 71. The drive of the semiconductor switches by the auxiliary control section 72 changes a value of the output voltage applied to the low-voltage line LL through the second output terminal Tout2 of the auxiliary drive section 71. The low-voltage line LL corresponds to an auxiliary electrical power supply line.

Figure 5:
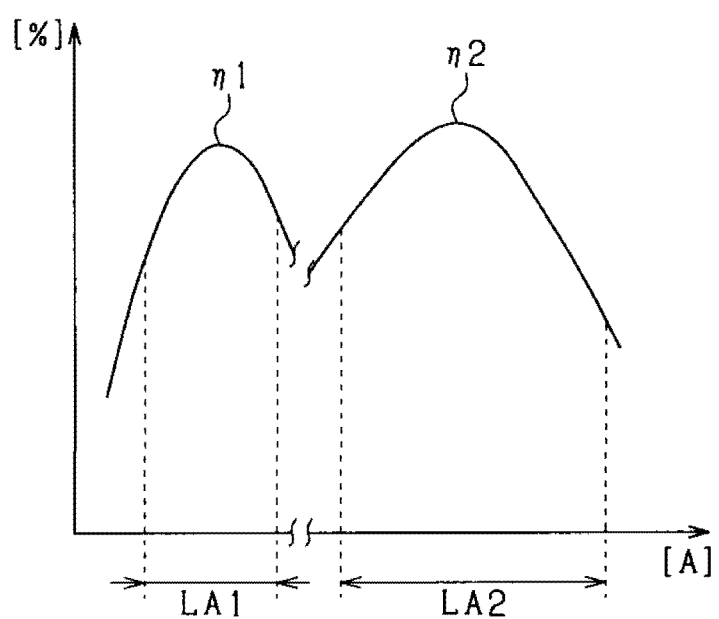
FIG. 5 is a graph illustrating a change of power conversion efficiency of a main DDC and a dark-current converter.

Power conversion efficiencies of the main DDC 20 and the dark-current converter 70 will be described. FIG. 5 is a graph illustrating a change of the power conversion efficiencies of the main DDC 20 and the dark-current converter 70. In FIG. 5, the horizontal axis indicates a load current [A], and the vertical axis indicates power conversion efficiency [%].

Power conversion efficiency $\eta 1$ of the dark-current converter 70 is higher than power conversion efficiency $\eta 2$ of the main DDC 20 within a first load current range LA1 corresponding to dark current flowing through the first equipment 40. In the present embodiment, the first load current range LA1 is a range of load current that the first equipment 40 can take in a standby state. The second load current range LA2 is a range of load current that the first equipment 40 can take in an operating state.

In the present embodiment, the minimum value of the second load current range LA2 is larger than the maximum value of the first load current range LA1. The peak of the power conversion efficiency $\eta 1$ of the dark-current converter 70 is included in the first load current range LA1. The power conversion efficiency $\eta 2$ of the main DDC 20 is smaller than the power conversion efficiency $\eta 1$ in the first load current range LA1. The peak of the power conversion efficiency $\eta 2$ is included in the second load current range LA2. Hence, the power conversion efficiency of the dark-current converter 70 is higher than that of the main DDC 20 when the first equipment 40 is in an operation stopped state (LA1).

Hence, in the present embodiment, in the standby state of the first equipment 40, the verification ECU 10 does not cause the main DDC 20 to supply electrical power to the first equipment 40, but causes the dark-current converter 70 to supply electrical power to the first equipment 40. In addition, when it is predicted that the first equipment 40 will shift from a standby state to an operating state, the verification ECU 10 causes the main DDC 20 to supply electrical power to the first equipment 40, thereby ensuring electrical power required for operation of the first equipment 40. Hence, the verification ECU 10 corresponds to a control apparatus.

Figure 6:
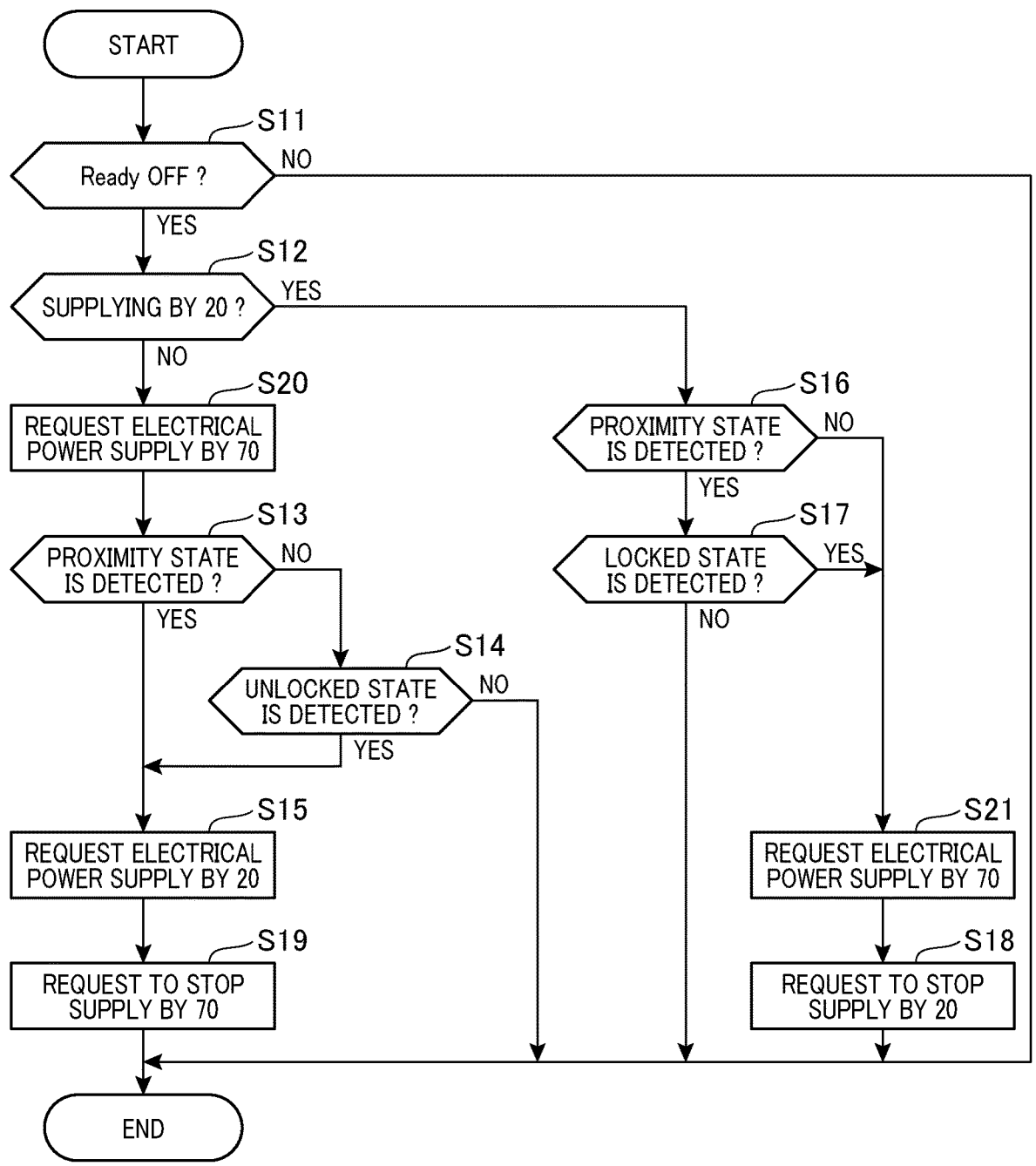
FIG. 6 is a flowchart illustrating power supply control.

Next, power supply control performed by the verification ECU 10 will be described with reference to the flowchart in FIG. 6. The process illustrated by the flowchart in FIG. 6 is repeatedly performed by the verification ECU 10 at predetermined control periods.

In step S11, if the verification ECU 10 determines that the state of the vehicle is ReafyOFF, the process proceeds to step S12. In contrast, if the verification ECU 10 determines that the state of the vehicle is ReafyON, the process shown in FIG. 6 is temporarily halted.

In step S12, if the verification ECU 10 determines that electrical power is not being supplied from the main DDC 20 to the first equipment 40, the process proceeds to step S20.

In step S20, electrical power supply from the dark-current converter 70 to the first equipment 40 is requested. When drive of the dark-current converter 70 is stopped, the verification ECU 10 issues to the HV-ECU 11 an equipment operation request to start electrical power supply to the dark-current converter 70. The equipment operation request to the dark-current converter 70 is received by the HV-ECU 11 through the in-vehicle NIF 14. Upon receiving the equipment operation request to the dark-current converter 70, the HV-ECU 11 causes the auxiliary control section 72 of the dark-current converter 70 to start electrical power supply to the first equipment 40. If the dark-current converter 70 has been already operated, even when receiving an equipment operation request from the HV-ECU 11, the auxiliary control section 72 continues electrical power supply to the first equipment 40.

In steps S13 and S14, the verification ECU 10 predicts that the first equipment 40 will shift from a standby state to an operating state. Steps S13, S14, S16, and S17 correspond to the operation prediction section.

In step S13, detection of the proximity state corresponds to prediction that the first equipment 40 will shift to an operating state, whereby the present control proceeds to step S15. In step S15, the verification ECU 10 issues to the main DDC 20 an equipment operation request to start electrical power supply to the first equipment 40.

In step S19, the verification ECU 10 issues an operation stop request to stop electrical power supply from the dark-current converter 70 to the first equipment 40. The operation stop request to the dark-current converter 70 is received by the HV-ECU 11 through the in-vehicle NIF 14. Upon receiving the operation stop request to the dark-current converter 70, the HV-ECU 11 causes the auxiliary control section 72 to stop electrical power supply from the dark-current converter 70 to the first equipment 40. Hence, only output voltage from the main DDC 20 is applied to the low-voltage line LL. The output voltage supplies electrical power to the first equipment 40.

In contrast, in step S12, if the verification ECU 10 determines that electrical power is being supplied from the main DDC 20 to the first equipment 40, the process proceeds to step S16.

In step S16, if the proximity state is not detected, the verification ECU 10 predicts that the first equipment 40 will shift to a standby state, and the present control proceeds to step S21. In step S17, if the change to a locked state is detected, the present control proceeds to step S21.

In step S21, the verification ECU 10 issues an equipment operation request to supply electrical power from the dark-current converter 70 to the first equipment 40. Upon receiving an operation start request to the dark-current converter 70 through the in-vehicle NIF 14, the HV-ECU 11 causes the auxiliary control section 72 to start electrical power supply from the dark-current converter 70 to the first equipment 40.

In step S18, the verification ECU 10 issues an operation stop request to stop electrical power supply from the main DDC 20 to the first equipment 40. Upon receiving the operation stop request to the main DDC 20 through the in-vehicle NIF 14, the HV-ECU 11 causes the main control section 22 to stop electrical power supply from the main DDC 20 to the first equipment 40. Hence, only output voltage from the dark-current converter 70 is applied to the low-voltage line LL. The output voltage supplies electrical power to the first equipment 40.

The present embodiment described above provides the following effects.

If it is not predicted that the first equipment 40 will shift from a standby state to an operating state, the verification ECU 10 sets the main DDC 20 to a standby state. Hence, electrical power is not supplied from the main DDC 20 to the first equipment 40. In this case, during a time period during which required electrical power of the first equipment 40 is low, electrical power is not supplied from the main DDC 20 to the first equipment 40. As a result, supplying electrical power from the dark-current converter 70 to the first equipment 40 can reduce electrical power loss and further reduce electrical power consumption of the control system 100. If it is predicted that the first equipment 40 will shift from a standby state to an operating state, the verification ECU 10 causes the main DDC 20 to operate to supply electrical power from the main DDC 20 to the first equipment 40. Hence, during a time period during which required electrical power of the first equipment 40 is high, supplying electrical power from the main DDC 20 to the first equipment 40 can prevent an electrical power shortage in the first equipment 40.

If a state where the distance between the electronic key 65 and the vehicle is more than the predetermined distance is detected based on a state of receiving transmission waves in the transmitter and receiver 60, the verification ECU 10 predicts that the first equipment 40 will shift from an operating state to a standby state. Then, if it is predicted that the first equipment 40 will shift to a standby state, the verification ECU 10 stops electrical power supply from the main DDC 20 to the first equipment 40 and causes the dark-current converter 70 to supply electrical power to the first equipment 40. In this case, predicting the shift of the first equipment 40 to a standby state based on a state of receiving transmission waves can appropriately reduce electrical power consumption of the control system 100.

After the shift of the first equipment 40 to an operating state is predicted, when the verification ECU 10 causes the main DDC 20 to supply electrical power to the main DDC 20, the verification ECU 10 causes the dark-current converter 70 to stop electrical power supply to the first equipment 40. In this case, electrical power is prevented from supplies from the first storage battery 50 to the same equipment through the main DDC 20 and the dark-current converter 70, thereby suppressing decrease in remaining capacity of the first storage battery 50.

The main DDC 20 and the dark-current converter 70 are connected to the high-voltage lines HL1 and HL2 at positions nearer to the main DDC 20 than the relays SMR1 and SMR2 are. Hence, regardless of opened or closed states of the relays SMR1 and SMR2, electrical power can be flexibly supplied from the main DDC 20 or the dark-current converter 70 to the first equipment 40.

Third Embodiment

Hereinafter, configurations of the third embodiment different from those of the second embodiment will be mainly described.

Figure 7:
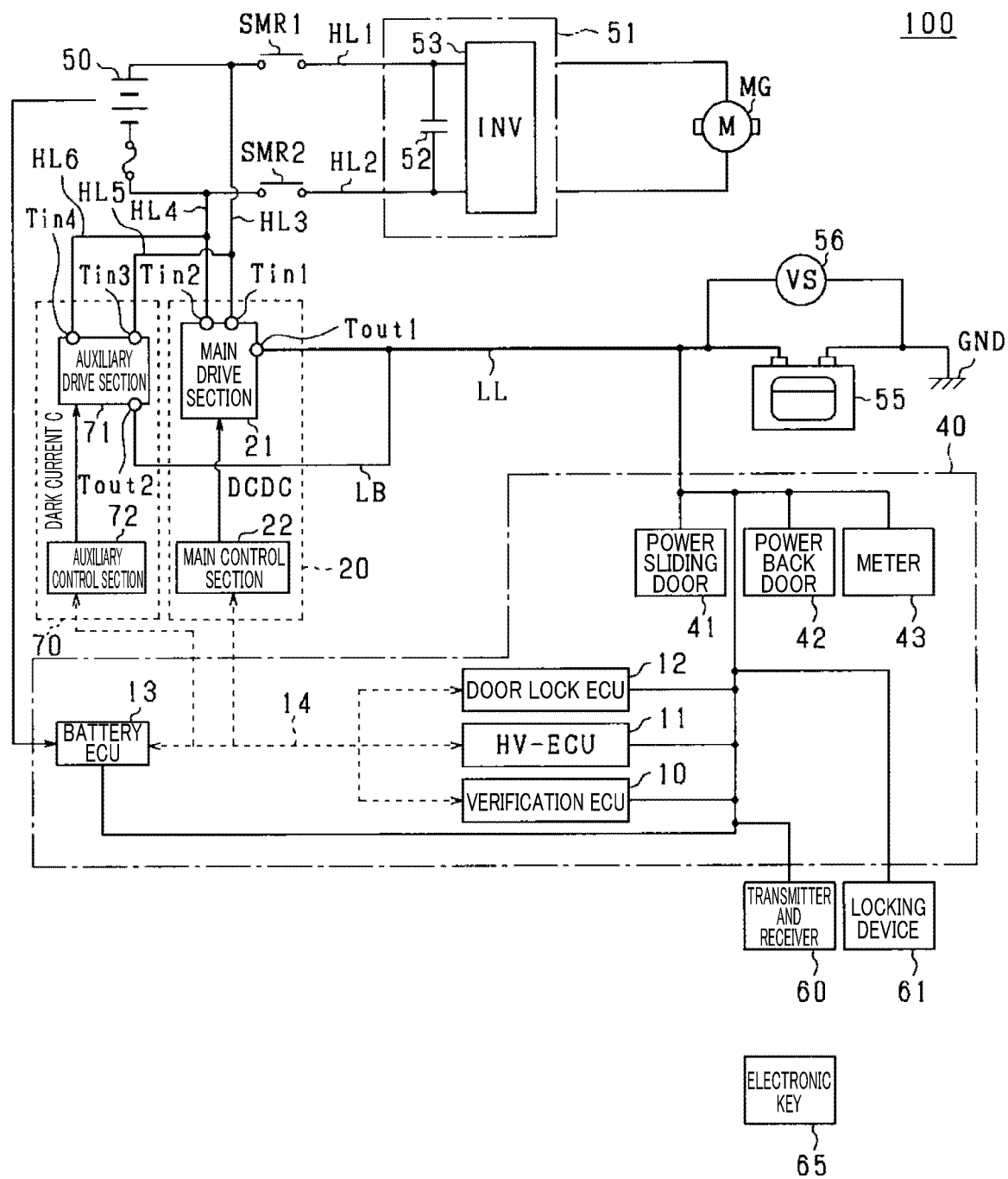
FIG. 7 is a diagram showing a configuration of a power supply system according to a third embodiment.

FIG. 7 is a diagram showing a configuration of the control system 100 according to the second embodiment. The same components as those shown in FIG. 1 are denoted by the same reference signs as a matter of convenience.

In the control system 100 according to the present embodiment, the low-voltage line LL is connected with the second storage battery 55 serving as an auxiliary electrical storage device supplying electrical power to the first equipment 40.

A positive terminal of the second storage battery 55 is connected to the low-voltage line LL, and a negative terminal of the second storage battery 55 is connected to the ground line GND. Hence, at least one of output voltage of the main DDC 20 and output voltage of the second storage battery 55 is applied to the low-voltage line LL.

In the present embodiment, storage capacity of the second storage battery 55 is less than storage capacity of the first storage battery 50. Voltage across terminals of the second storage battery 55 is lower than voltage across terminals of the first storage battery 50. For example, the second storage battery 55 is a lead storage battery, and the voltage across the terminals of the second storage battery 55 is 12 V.

The control system 100 includes a voltage detection sensor 56 that detects a voltage VSr across the terminals of the second storage battery 55. The voltage VSr across the terminals detected by the voltage detection sensor 56 is output to the verification ECU 10. The battery ECU 13 calculates a remaining capacity of the second storage battery 55 as the second remaining capacity SOC2, based on various pieces of information of the second storage battery 55.

Figure 8:
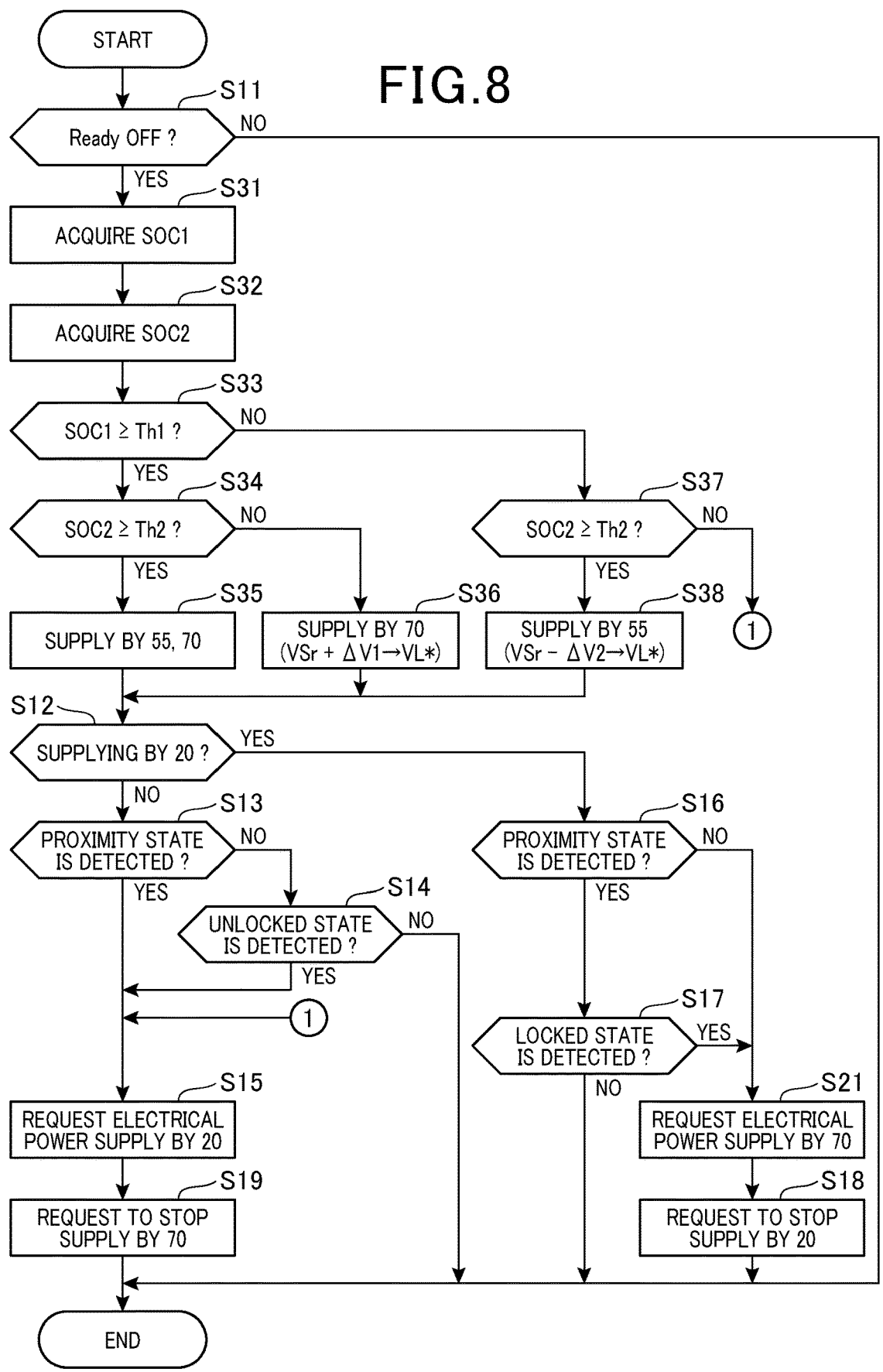
FIG. 8 is a flowchart illustrating power supply control.

Next, power supply control according to the second embodiment will be described with reference to the flowchart in FIG. 8. The process illustrated in the flowchart in FIG. 8 is repeatedly performed at predetermined control periods by the verification ECU 10.

In step S11, if it is determined that the state of the vehicle is ReafyOFF, the present control proceeds to step S31. In step S31, the verification ECU 10 acquires a first remaining capacity SOC1 indicating a remaining capacity of the first storage battery 50. Step S31 corresponds to a main acquisition section. The verification ECU 10 acquires the first remaining capacity SOC1 from the battery ECU 13 through the in-vehicle NIF 14.

In step S32, the verification ECU 10 acquires a second remaining capacity SOC2 indicating a remaining capacity of the second storage battery 55. Step S32 corresponds to an auxiliary acquisition section.

In step S33, the verification ECU 10 compares the first remaining capacity SOC1 with a main threshold Th1. The main threshold Th1 is a threshold for determining the remaining capacity of the first storage battery 50. The main threshold Th1 is defined as, for example, a value larger than the first remaining capacity SOC1 that causes deterioration of the first storage battery 50 when discharge is repeated. If it is determined that the first remaining capacity SOC1 is the main threshold Th1 or more, the present control proceeds to step S34.

In step S34, the verification ECU 10 compares the second remaining capacity SOC2 with an auxiliary threshold Th2. The auxiliary threshold Th2 is defined as, for example, a value larger than the second remaining capacity SOC2 that causes deterioration of the second storage battery 55 when discharge is repeated. If it is determined that the second remaining capacity SOC2 is the auxiliary threshold Th2 or more, the present control proceeds to step S35.

In the present embodiment, since the storage capacity of the second storage battery 55 is smaller than the storage capacity of the first storage battery 50, the auxiliary threshold Th2 is defined as a value less than the main threshold Th1.

In step S35, since the first remaining capacity SOC1 is the main threshold Th1 or more, and the second remaining capacity SOC2 is the auxiliary threshold Th2 or more, the verification ECU 10 causes the second storage battery 55 and the dark-current converter 70 to supply electrical power to the first equipment 40.

In step S34, if it is determined that the second remaining capacity SOC2 is less than the auxiliary threshold Th2, the present control proceeds to step S36. When the storage capacity of the second storage battery 55 is less than the storage capacity of the first storage battery 50, the storage capacity of the second storage battery 55 becomes small, thereby easily leading to an over discharge state. Hence, in step S36, an output voltage command value VL* of the dark-current converter 70 is set to a value higher the voltage VSr across the terminals of the second storage battery 55 to cause only the dark-current converter 70 to supply electrical power to the first equipment 40.

Specifically, the verification ECU 10 adds a correction value ΔV1 to the voltage VSr across the terminals detected by the voltage detection sensor 56. Then, the verification ECU 10 sets the voltage VSr across the terminals, to which the correction value ΔV1 is added, to the output voltage command value VL* of the dark-current converter 70. Hence, output voltage of the dark-current converter 70 becomes larger than the voltage VSr across the terminals of the second storage battery 55 by the output voltage command value VL*, whereby current flows from the dark-current converter 70 to the second storage battery 55 through the low-voltage line LL. As a result, the verification ECU 10 causes the second storage battery 55 to stop electrical power supply to the first equipment 40.

In step S33, if it is determined that the first remaining capacity SOC1 is less than the main threshold Th1, the present control proceeds to step S37. In step S37, if it is determined that the second remaining capacity SOC2 is the auxiliary threshold Th2 or more, the present control proceeds to step S38. In step S38, the output voltage command value VL* of the dark-current converter 70 is set to a value lower the voltage VSr across the terminals of the second storage battery 55 to cause only the second storage battery 55 to supply electrical power to the first equipment 40.

Specifically, the verification ECU 10 subtracts a correction value ΔV2 from the voltage VSr across the terminals detected by the voltage detection sensor 56. Then, the verification ECU 10 sets the voltage VSr across the terminals, from which the correction value ΔV2 is subtracted, to the output voltage command value VL* of the dark-current converter 70. Hence, the output voltage of the dark-current converter 70 becomes lower than the voltage VSr across the terminals of the second storage battery 55 by the output voltage command value VL*, whereby current flows from the second storage battery 55 to the dark-current converter 70 through the low-voltage line LL. As a result, electrical power supply from the dark-current converter 70 to the first equipment 40 is stopped.

In step S37, if it is determined that the second remaining capacity SOC2 is less than the auxiliary threshold Th2, the present control proceeds to step S15. In this case, the remaining capacities SOC1 and SOC2 of the storage batteries 50 and 55 are not adequate. In the second embodiment, in order to preferentially use the first storage battery 50 having a larger storage capacity, in step S15, the verification ECU 10 cases the first storage battery 50 to supply electrical power to the first equipment 40 through the main DDC 20.

Hereinafter, as illustrated in FIG. 6 of the second embodiment, the processes of steps S15 to S21 are performed. If electrical power is being supplied from the dark-current converter 70 to the first equipment 40, after causing the main DDC 20 to supply electrical power to the first equipment 40 (step S15), the verification ECU 10 requests the dark-current converter 70 to stop to suppress decrease in the storage capacity of the first storage battery 50 (step S19). If the process of step S19 or S20 ends, the process in FIG. 8 temporarily halts.

The present embodiment described above provides the following effects.

The control system 100 includes the second storage battery 55 that supplies electrical power to the first equipment 40. When it is not predicted that the first equipment 40 will shift to an operating state, the verification ECU 10 causes, in addition to the dark-current converter 70, the second storage battery 55 to supply electrical power to the first equipment 40. According to the above configuration, even in a situation where any one of the second storage battery 55 and the dark-current converter 70 cannot supply electrical power to the first equipment 40, the other of the second storage battery 55 and the dark-current converter 70 can supply electrical power to the first equipment 40. As a result, a state where electrical power is not supplied to the first equipment 40 can be prevented.

If it is determined that the first remaining capacity SOC1 of the first storage battery 50 is lower than the main threshold Th1, the verification ECU 10 sets the output voltage command value VL* of the dark-current converter 70 to a value lower than the voltage VSr across the terminals of the second storage battery 55 to stop the operation of the dark-current converter 70. Hence, deterioration of the first storage battery 50 due to over discharge can be prevented. In addition, since electrical power supply between the dark-current converter 70 and the second storage battery 55 can be switched without components such as relays for switching electrical connections, physical size of the control system 100 can be prevented from increasing.

If it is determined that the second remaining capacity SOC2 of the second storage battery 55 is more than the auxiliary threshold Th2, the verification ECU 10 sets the output voltage command value VL* of the dark-current converter 70 to a value higher than the voltage VSr across the terminals of the second storage battery 55 to cause the dark-current converter 70 to supply electrical power to the first equipment 40. Hence, deterioration of the second storage battery 55 due to over discharge can be prevented. In addition, since electrical power supply between the dark-current converter 70 and the second storage battery 55 can be switched without components such as relays for switching electrical connections, physical size of the control system 100 can be prevented from increasing.

Fourth Embodiment

Hereinafter, configurations of the fourth embodiment different from those of the third embodiment will be mainly described.

Figure 9:
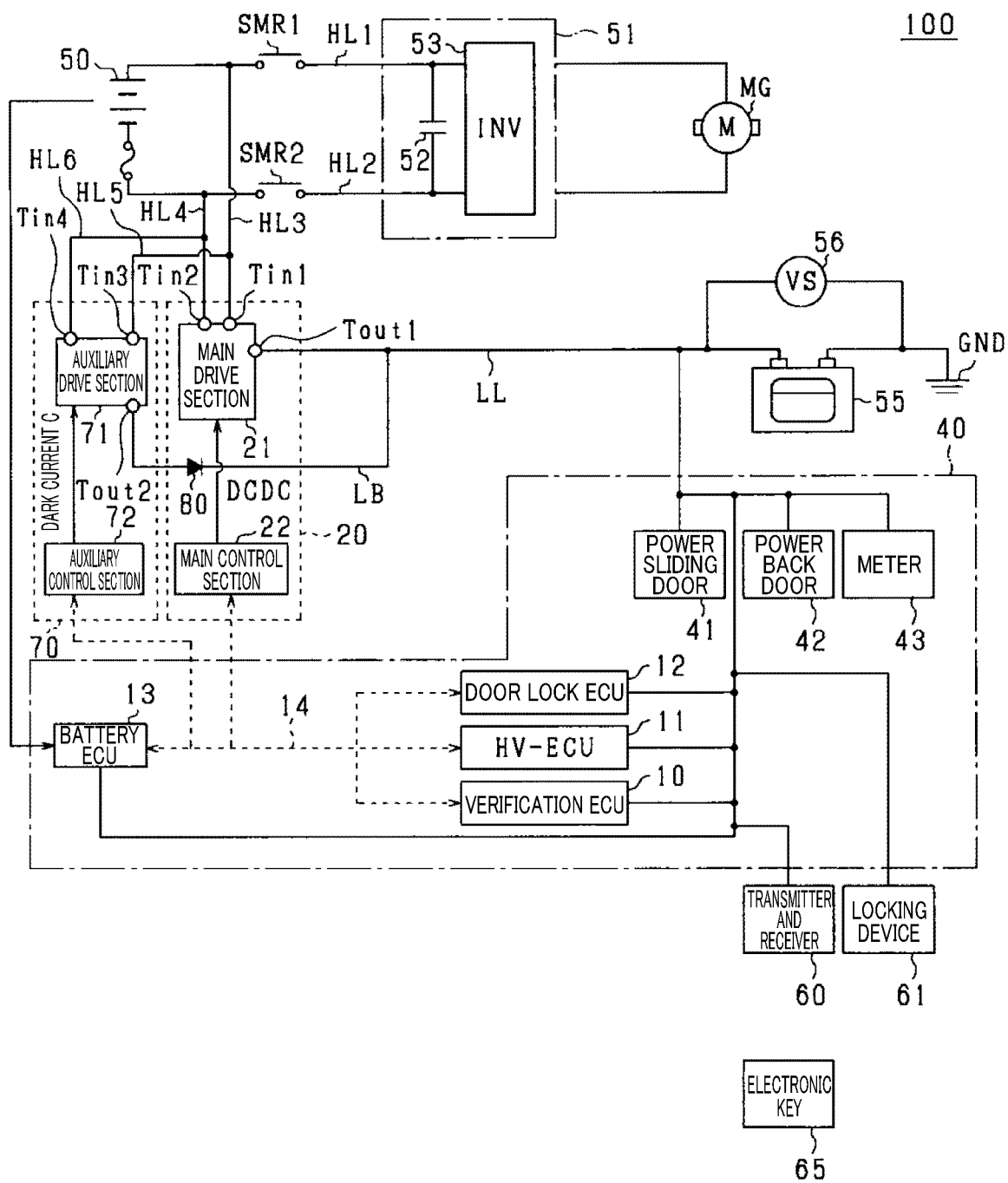
FIG. 9 is a diagram showing a configuration of a power supply system according to a fourth embodiment.

FIG. 9 is a diagram showing a configuration of the control system 100 according to the third embodiment. The control system 100 according to the third embodiment includes a backflow prevention section 80 that prevents a current flowing through the low-voltage line LL from flowing from the main DDC 20 to the dark-current converter 70.

After electrical power supply from the main DDC 20 to the first equipment 40 is started in step S15 in FIG. 6, the operation of the dark-current converter 70 is stopped in step S19. In addition, after electrical power supply from the dark-current converter 70 to the first equipment 40 is started in step S21, the operation of the main DDC 20 is stopped in step S18. If output voltage of the main DDC 20 is higher than output voltage of the dark-current converter 70, current may flow from the main DDC 20 to the dark-current converter 70 through the auxiliary line LB. Hence, in the third embodiment, the backflow prevention section 80 is provided to the auxiliary line LB.

In the present embodiment, a diode is used as the backflow prevention section 80. Specifically, on the auxiliary line LB, the anode of the diode is connected to the second output terminal Tout2 of the dark-current converter 70, and the cathode of the diode is connected to the low-voltage line LL. Hence, even in a situation where output voltage of the main DDC 20 is higher than output voltage of the dark-current converter 70, the backflow prevention section 80 can prevent current from flowing from the low-voltage line LL to the auxiliary line LB.

The present embodiment described above provides the following effects.

Even in a case where after the main DDC 20 is caused to supply electrical power to the first equipment 40, the dark-current converter 70 is caused to stop supplying electrical power to the first equipment 40, current can be prevented from flowing from the main DDC 20 to the dark-current converter 70 through the auxiliary line LB. As a result, deterioration of the dark-current converter 70 due to the current can be prevented.

Fifth Embodiment

Hereinafter, configurations of the fifth embodiment different from those of the fourth embodiment will be mainly described.

Figure 10:
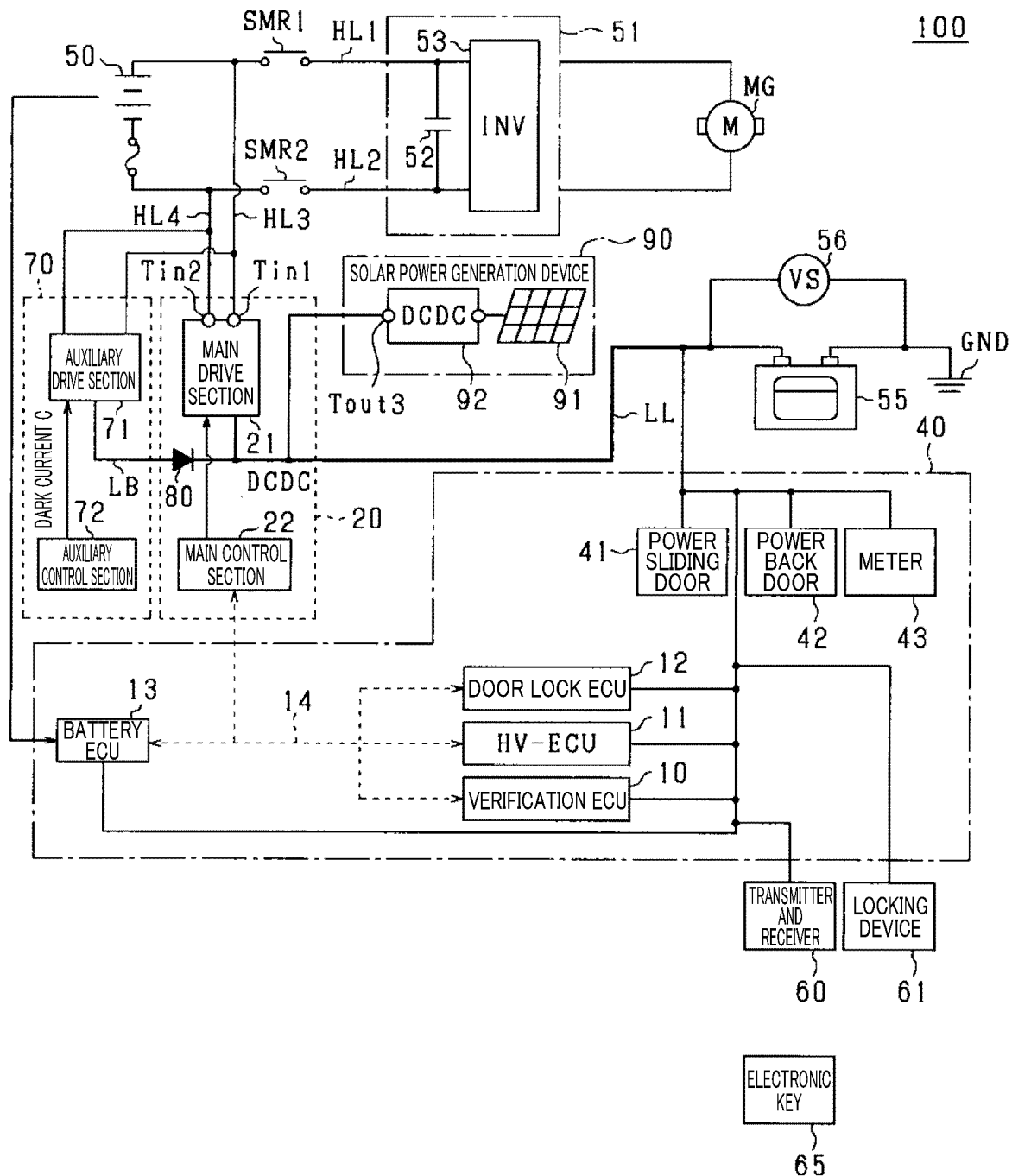
FIG. 10 is a diagram showing a configuration of a power supply system according to a fifth embodiment.

FIG. 10 is a diagram showing a configuration of the control system 100 according to the fifth embodiment. The control system 100 according to the fifth embodiment includes a solar power generation device 90 that supplies electrical power to the first equipment 40. Hence, in the fourth embodiment, the second storage battery 55 and the solar power generation device 90 correspond to the auxiliary electrical storage device.

The solar power generation device 90 includes a solar panel 91 that converts sunlight to electrical energy and a panel DC/DC converter 92 that transforms output from the solar panel 91. The panel DC/DC converter 92 transforms output voltage from the solar panel 91 to output voltage (e.g., 12V) for drive of the first equipment 40.

A third output terminal Tout3 of the panel DC/DC converter 92 is connected to the low-voltage line LL. Hence, output voltage transformed by the panel DC/DC converter 92 is applied to the low-voltage line LL. As a result, the solar power generation device 90 supplies electrical power to the first equipment 40.

The present embodiment described above provides the following effects.

Since the solar power generation device 90 is an electrical power supply means that does not require the storage capacity of the second storage battery 55, electrical power consumption of the first storage battery 50 and the second storage battery 55 can be suppressed in an environment in which the solar power generation device 90 can operate (e.g., during the clear daytime). Hence, fuel consumption of the vehicle can be improved, and deterioration of the storage batteries 50 and 55 can be suppressed.

Sixth Embodiment

Hereinafter, configurations of the sixth embodiment different from those of the third embodiment will be mainly described.

Figure 11:
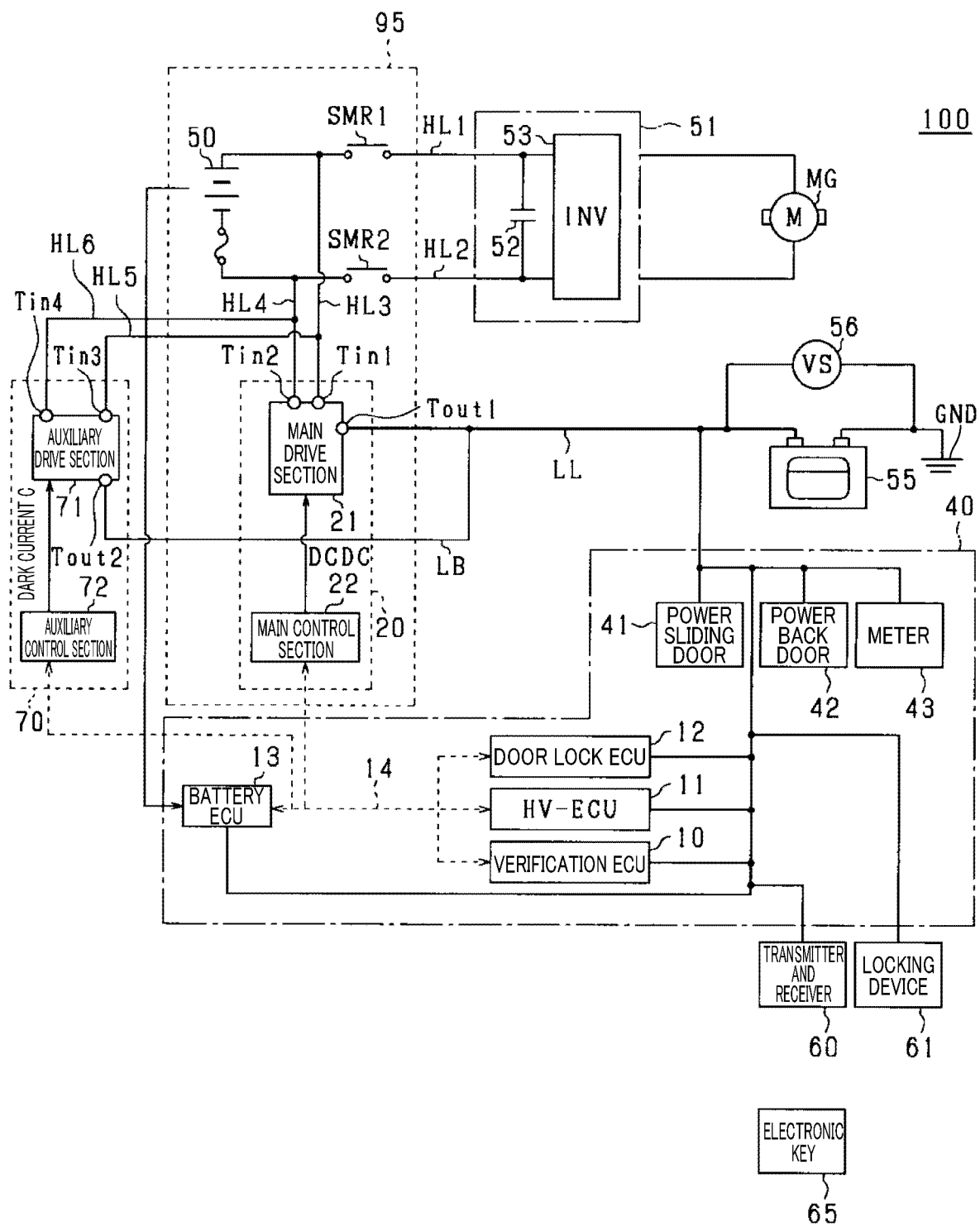
FIG. 11 is a diagram showing a configuration of a power supply system according to a sixth embodiment.

FIG. 11 is a diagram showing a configuration of the control system 100 according to the sixth embodiment. The control system 100 according to the sixth embodiment includes a housing 95 that accommodates the first storage battery 50, the main DDC 20, and the relays SMR1 and SMR2.

In the above configuration, in ReadyOFF of the vehicle, the relays SMR1 and SMR2 are in opened states, and electrical power is not supplied from the first storage battery 50 to the second equipment 51. Hence, even when a mechanic, a user, or the like touches the second equipment 51 outside the housing 95, he can be prevented from getting an electrical shock. It is noted that, as in the present embodiment, the control system 100 shown in FIG. 1 may include the housing 95 that accommodates the first storage battery 50, the main DDC 20, and the relays SMR1 and SMR2.

OTHER EMBODIMENTS

In steps S15 and S21, the verification ECU 10 may directly transmit to the main DDC 20 a request to supply electrical power and stop the electrical power supply. In steps S19 and S18, the verification ECU 10 may directly transmit to the dark-current converter 70 a request to supply electrical power and stop the electrical power supply. In this case, for example, in Ready off, even when the HV-ECU 11 has shifted to a sleep mode, electrical power can be supplied from the main DDC 20 to the first equipment 40 and the electrical power supply can be stopped, without activating the HV-ECU 11.

Instead of the verification ECU 10, the main control section 22 of the main DDC 20 may perform the processes illustrated in FIG. 6 and FIG. 8. Even in this case, the main control section 22 acquires necessary information from the ECUs 10 to 13 through the in-vehicle NIF 14.

The verification ECU 10 may be installed in an apparatus other than the vehicle.

Instead of the storage batteries, capacitors may be used as the electrical storage devices.

Instead of the second storage battery 55 and the first storage battery 50, the storage capacity of the second storage battery 55 being less than the storage capacity of the first storage battery 50, the second storage battery 55 and the first storage battery 50 having the same storage capacity may be used.

The switching section provided to the high-voltage lines HL1 and HL2 are not limited to the relays.

Providing the relays SMR1 and SMR2 to the high-voltage lines HL1 and HL2 connecting the first storage battery 50 and the second equipment 51 is a mere example. The relays SMR1 and SMR2 may not be provided to the high-voltage lines HL1 and HL2. Specifically, the processes illustrated in FIG. 6 and FIG. 8 may be performed in a state where the vehicle is not running. In this case, in FIG. 6 and FIG. 8, the verification ECU 10 may not perform the process in step S11 that determines ReadyOFF in which the relays SMR1 and SMR2 are in opened states.

Elements used for the backflow prevention section 80 may have characteristics in the direction of current flow. Hence, a thyristor, a GTO, an IGBT, or the like may be used instead of the diode.

In the first embodiment, instead of the electronic key 65, a mobile terminal such as a cellular phone may be used. In this case, in steps S13 and S16 in FIGS. 6 and 8, a proximity state is detected based on transmission waves transmitted from the cellular phone. In addition, in a case of a configuration in which an unlocked state and a locked state of the vehicle door can be switched by a signal from the mobile terminal, in steps S14 and A17, an unlocked state or a locked state of the vehicle door is detected according to the signal from the mobile terminal.

In step S15, after the main DDC 20 is activated, the dark-current converter 70 may not be stopped.

In the first embodiment, the storage capacity of the second storage battery 55 may be more than the storage capacity of the first storage battery 50.

The present disclosure has been described on the basis of the embodiments, but it is understood that the present disclosure is not limited to the embodiments or the structures. The present disclosure includes various modified examples and modifications within an equivalent range. In addition, a category or range of thought of the present disclosure includes various combinations or forms and other combinations or forms including only one element, one or more elements, or one or less elements of those.

A control apparatus according to a first disclosure is applied to a power supply system including: a main electrical storage device; a main electrical power conversion device that decreases output voltage of the main electrical storage device and supplies the decreased output voltage to equipment; and an electrical power supply section that supplies electrical power to the equipment. The control apparatus includes an operation prediction section that predicts that the equipment will shift from an operation stopped state to an operating state; and a supply control section that, if it is not predicted that the equipment will shift from the operation stopped state to the operating state, sets the main electrical power conversion device to the operation stopped state and causes the electrical power supply section to supply electrical power to the equipment, and that, if it is predicted that the equipment will shift from the operation stopped state to the operating state, operates the main electrical power conversion device to supply electrical power from the main electrical power conversion device to the equipment.

In the above configuration, if it is not predicted that the equipment will shift from the operation stopped state to the operating state, the main electrical power conversion device is set to the operation stopped state, and electrical power is supplied from the electrical power supply section to the equipment. Hence, during a time period during which required electrical power of the equipment is low, electrical power is not supplied from the main electrical power conversion device to the equipment but is supplied from the electrical power supply section to the equipment. Hence, electrical power loss is reduced, and furthermore, decrease in the power conversion efficiency of the power supply system can be prevented. In addition, in the above configuration, if it is predicted that the equipment will shift from the operation stopped state to the operating state, the main electrical power conversion device is operated to supply electrical power from the main electrical power conversion device to the equipment. Hence, during a time period during which required electrical power of the equipment is high, supplying electrical power from the main electrical power conversion device to the equipment can prevent an electrical power shortage in the equipment.

In a second disclosure, the electrical power supply section is electrically connected with the main electrical power conversion device and the equipment and supplies electrical power to the equipment.

In the power supply system, in a situation where required electrical power of the equipment is low, output electrical power to the equipment may be significantly lower than the power capacity that the system can output. In addition, when the output voltage of the main electrical storage device is decreased, electrical power consumed by the main electrical power conversion device becomes a loss. Hence, in a situation where required electrical power of the equipment is low, power conversion efficiency of the system may decrease. The decrease in the power conversion efficiency of the power supply system may lead to decrease in the amount of electrical power that can be supplied from the main electrical storage device to the equipment. In addition, when the storage capacity of the main electrical storage device is increased to compensate for the decrease in the amount of electrical power, physical size of the main electrical storage device may be increased.

In this regard, in the above configuration, if it is not predicted that the equipment will shift from the operation stopped state to the operating state, the main electrical power conversion device is set to the operation stopped state. Hence, electrical power is not supplied from the main electrical power conversion device to the equipment. In this case, during a time period during which required electrical power of the equipment is low, electrical power is not supplied from the main electrical power conversion device to the equipment. As a result, supplying electrical power from the auxiliary electrical storage device to the equipment can prevent decrease in the power conversion efficiency of the power supply system. In addition, in the above configuration, if it is predicted that the equipment will shift from the operation stopped state to the operating state, the main electrical power conversion device is operated to supply electrical power from the main electrical power conversion device to the equipment. Hence, during a time period during which required electrical power of the equipment is high, supplying electrical power from the main electrical power conversion device to the equipment can prevent an electrical power shortage in the equipment.

In a third disclosure, the equipment is defined as first equipment, the power supply system is electrically connected to the main electrical storage device and includes second equipment having a load higher than that of the first equipment. When electrical power is not being supplied from the main electrical storage device to the second equipment, and it is not predicted that the first equipment will shift from an operation stopped state to an operating state, the supply control section sets the main electrical power conversion device to an operation stopped state.

In a state where the main electrical storage device is not supplying electrical power to the second equipment, output electrical power of the whole power supply system is low. In this situation, if electrical power is converted by the main electrical power conversion device, the power conversion efficiency of the power supply system significantly decreases. Hence, in the above configuration, when electrical power is not being supplied from the main electrical storage device to the second equipment, and it is not predicted that the first equipment will shift from an operation stopped state to an operating state, the main electrical power conversion device is set to an operation stopped state. In this case, decrease in the power conversion efficiency of the whole system can be prevented.

In a fourth disclosure, the electrical power supply section is an auxiliary electrical power conversion device that has power conversion efficiency higher than that of the main electrical power conversion device in an operation stopped state of the equipment, and decreases output voltage of the main electrical storage device to supply the decreased output voltage to the equipment. If it is not predicted that the equipment will shift from the operation stopped state to the operating state, the supply control section sets the main electrical power conversion device to the operation stopped state and operates the auxiliary electrical power conversion device to supply electrical power from the auxiliary electrical power conversion device to the equipment.

When the main electrical power conversion device supplies electrical power to the equipment, the main electrical power conversion device consumes electrical power for operation thereof. Hence, if the electrical power consumption of the main electrical power conversion is high, the amount of electrical power that can be supplied from the main electrical storage device to the equipment may be decreased. In addition, when the storage capacity of the main electrical storage device is increased to compensate for the decrease in the amount of electrical power, physical size of the main electrical storage device may be increased.

In the above configuration, if it is not predicted that the equipment will shift from an operation stopped state to an operating state, the main electrical power conversion device is set to the operation stopped state, and the auxiliary electrical power conversion device is set to the operating state. Hence, during a time period during which required electrical power of the equipment is low, electrical power is not supplied from the main electrical power conversion device to the equipment. As a result, supplying electrical power from the auxiliary electrical power conversion device, which has power conversion efficiency higher than that of the main electrical power conversion device in an operation stopped state of the equipment, to the equipment can reduce electrical power loss and further reduce electrical power consumption of the power supply system. In addition, in the above configuration, if it is predicted that the equipment will shift from an operation stopped state to an operating state, the main electrical power conversion device is operated to supply electric power from the main electrical power conversion device to the equipment. Hence, during a time period during which required electrical power of the equipment is high, supplying electrical power from the main electrical power conversion device to the equipment can prevent an electrical power shortage in the equipment.

In a fifth disclosure, the equipment is defined as first equipment, the power supply system is electrically connected to the main electrical storage device and includes second equipment having a load higher than that of the first equipment. When electrical power is not being supplied from the main electrical storage device to the second equipment, and it is not predicted that the first equipment will shift from an operation stopped state to an operating state, the supply control section sets the main electrical power conversion device to an operation stopped state and operates the auxiliary electrical power conversion device to supply electrical power to the equipment.

In a state where the main electrical storage device is not supplying electrical power to the second equipment, electrical power consumption of the whole power supply system is low. In this situation, if the main electrical power conversion device is operated, the ratio of the electrical power consumption by the main electrical power conversion device to the electrical power consumption of the whole power supply system becomes high. Hence, in the above configuration, when electrical power is not being supplied from the main electrical storage device to the second equipment, and it is not predicted that the first equipment will shift from an operation stopped state to an operating state, the main electrical power conversion device is set to an operation stopped state, and the auxiliary electrical power conversion device supplies electrical power to the first equipment. In this case, the electrical power consumption of the whole system can be effectively reduced.

In a sixth disclosure, power conversion efficiency of the auxiliary electrical power conversion device is higher than power conversion efficiency of the main electrical power conversion device within a load current range corresponding to a dark current flowing through the equipment. During a time period during which required electrical power is low, a load current range of the equipment corresponds to dark current. Hence, in the above configuration, within a load current range corresponding to dark current, the auxiliary electrical power conversion device having power conversion efficiency higher than power conversion efficiency of the main electrical power conversion device is used.

In a seventh disclosure, an auxiliary electrical power conversion device is provided which decreases output voltage of the main electrical storage device and supplies the decreased output voltage to the equipment. In the above configuration, in an operation stopped state of the equipment, even when any one of the auxiliary electrical storage device and the auxiliary electrical power conversion device cannot supply electrical power to the equipment, the other of the auxiliary electrical storage device and the auxiliary electrical power conversion device supplies electrical power to the equipment can prevent a state where electrical power is not supplied to the equipment.

In an eighth disclosure, a main acquisition section is provided which acquires a remaining capacity of the main electrical storage device. When the remaining capacity of the main electrical storage device falls below a main threshold, the supply control section sets an output voltage command value of the auxiliary electrical power conversion device to a value lower than output voltage of the auxiliary electrical storage device to stop electrical power supply from the auxiliary electrical power conversion device to the equipment.

When the main electrical storage device is in an over discharge state, the main electrical storage device may greatly deteriorate. Hence, in the above configuration, when a remaining capacity of the main electrical storage device is low, electrical power supply from the main electrical storage device to the equipment through the auxiliary electrical power conversion device is stopped to prevent an over discharge state of the main electrical storage device. As a result, deterioration of the main electrical storage device due to over discharge can be suppressed.

In a ninth disclosure, an auxiliary acquisition section is provided which acquires a remaining capacity of the auxiliary electrical storage device. When the remaining capacity of the auxiliary electrical storage device falls below an auxiliary threshold, the supply control section sets an output voltage command value of the auxiliary electrical power conversion device to a value higher than output voltage of the auxiliary electrical storage device to stop electrical power supply from the auxiliary electrical storage device to the equipment.

In the above configuration, when the remaining capacity of the auxiliary electrical storage device falls below an auxiliary threshold, electrical power supply from the auxiliary electrical storage device to the equipment is stopped. In this case, deterioration of the auxiliary electrical storage device due to over discharge can be prevented.

In a tenth disclosure, after it is predicted that the equipment will shift to an operating state, the supply control section stops electrical power supply from the auxiliary electrical power conversion device to the equipment when causing the main electrical power conversion device to supply electrical power to the equipment. According to the configuration, electrical power is prevented from being supplied from the main electrical storage device to the same equipment through the main electrical power conversion device and the auxiliary electrical power conversion device, thereby suppressing decrease in a remaining capacity of the main electrical storage device.

In an eleventh disclosure, the power supply system is installed in a vehicle including a receiver that receives transmission waves transmitted from a portable device carried by a user. The operation prediction section predicts that the equipment will shift to an operating state, when detecting a state where a distance between the portable device and the vehicle is a predetermined distance or less based on the transmission waves received by the receiver.

When the user carrying the portable device approaches the vehicle, the equipment is highly likely to shift to an operating state. Hence, in the above configuration, when a state where a distance between the portable device and the vehicle is a predetermined distance or less is detected based on the transmission waves, it is predicted that the equipment will shift to an operating state.

In a twelfth disclosure, when detecting the state where the distance between the portable device and the vehicle is more than the predetermined distance based on a reception state of the transmission waves in the receiver, the operation prediction section predicts that the equipment will shift from the operating state to the operation stopped state. If it is predicted that the equipment will shift to the operation stopped state, the supply control section stops electrical power supply from the main electrical power conversion device to the equipment.

When the equipment shifts from an operating state to an operation stopped state, required electrical power of the equipment decreases. In this state, if electrical power supply of the main electrical power conversion device is kept, the power conversion efficiency may decrease. Hence, in the configuration, when the state where the distance between the portable device and the vehicle is more than a predetermined distance is detected based on a reception state of the transmission waves in the receiver, it is predicted that the equipment will shift from the operating state to the operation stopped state. Then, if it is predicted that the equipment will shift to the operation stopped state, electrical power supply from the main electrical power conversion device to the equipment is stopped. Thereby, decrease in power conversion efficiency can be appropriately prevented.

In a thirteenth disclosure, the power supply system is installed in a vehicle including a locking device that switches between an unlocked state and a locked state of a vehicle door. When the unlocked state is detected, the operation prediction section predicts that the equipment will shift to the operating state.

When the vehicle becomes an unlocked state, the equipment is highly likely to shift to an operating state. Hence, in the above configuration, when the unlocked state of the locking device is detected, it is predicted that the equipment will shift to the operating state. In this case, prediction accuracy in the shift of the equipment to the operating state can be increased, and decrease in power conversion efficiency can be appropriately prevented.

In a fourteenth disclosure, when the vehicle door is switched from the unlocked state to the locked state, the operation prediction section predicts that the equipment will shift from the operating state to the operation stopped state.

If it is predicted that the equipment will shift to the operation stopped state, the supply control section stops electrical power supply from the main electrical power conversion device to the equipment.

In the above configuration, when the locked state of the locking device is detected, the shift to the operation stopped state is detected. Hence, prediction accuracy in the shift of the equipment to the operation stopped state can be increased, and decrease in power conversion efficiency can be appropriately prevented.

In addition, a control system including the control apparatus and the power supply system according to the present disclosure can be provided.

Specifically, the control apparatus and the power supply system are included. The equipment is defined as first equipment. The power supply system includes: a main electrical power supply line; second equipment that is electrically connected to the main electrical storage device through the main electrical power supply line and has a load higher than that of the first equipment; and a switching section that is provided to the main electrical power supply line and switches electrical connection between the main electrical storage device and the second equipment. The main electrical power conversion device is connected to the main electrical power supply line at a position nearer to the main electrical storage device than the switching section is.

Specifically, in a sixteenth disclosure, the control apparatus and the power supply system are included. The equipment is defined as first equipment. The power supply system includes: a main electrical power supply line; second equipment that is electrically connected to the main electrical storage device through the main electrical power supply line and has a load higher than that of the first equipment; and a switching section that is provided to the main electrical power supply line and switches electrical connection between the main electrical storage device and the second equipment. The main electrical power conversion device and the auxiliary electrical power conversion device are connected to the main electrical power supply line at positions nearer to the main electrical storage device than the switching section is.

In the above configuration, even in a situation where electrical power is not supplied from the main electrical storage device to the second equipment by the switching section, the main electrical power conversion device and the auxiliary electrical power conversion device can be caused to supply electrical power to the first equipment. Hence, electrical power can be flexibly supplied from the main electrical power conversion device and the auxiliary electrical power conversion device to the first equipment.

In a seventeenth disclosure, there are included an auxiliary electrical storage device that is electrically connected with the main electrical power conversion device and the equipment and supplies electrical power to the equipment; an auxiliary electrical power supply line that electrically connects the main electrical power conversion device and the auxiliary electrical storage device; and an auxiliary line that electrically connects the auxiliary electrical power conversion device and the auxiliary electrical power supply line. After it is predicted that the equipment will shift to an operating state, the supply control section stops electrical power supply from the auxiliary electrical power conversion device to the equipment when causing the main electrical power conversion device to supply electrical power to the equipment. A backflow prevention section is further included which is provided to the auxiliary line and prevents current flow from the main electrical power conversion device to the auxiliary electrical storage device.

In the above configuration, even in a case where after the main electrical power conversion device is caused to supply electrical power to the equipment, the auxiliary electrical power conversion device is caused to stop supplying electrical power to the equipment, current flow from the main electrical power conversion device to the auxiliary electrical power conversion device through the auxiliary line can be prevented. As a result, deterioration of the auxiliary electrical power conversion device due to backward current can be suppressed.

What is claimed is:

1. A control apparatus that is applied to a power supply system including a main electrical storage device, a main electrical power conversion device that decreases output voltage of the main electrical storage device to supply the decreased output voltage to equipment, an auxiliary electrical storage device that is electrically connected with the main electrical power conversion device and the equipment and supplies electrical power to the equipment, and an auxiliary electrical power conversion device that decreases output voltage of the main electrical storage device and supplies the decreased output voltage to the equipment, the control apparatus comprising:
an operation prediction section that predicts that the equipment will shift from an operation stopped state to an operating state; and
a supply control section that, if it is not predicted that the equipment will shift from the operation stopped state to the operating state, sets the main electrical power conversion device to the operation stopped state and operates the auxiliary electrical power conversion device to supply electrical power from the auxiliary electrical power conversion device to the equipment, and that, if it is predicted that the equipment will shift from the operation stopped state to the operating state, operates the main electrical power conversion device to supply electrical power from the main electrical power conversion device to the equipment, wherein
power conversion efficiency of the auxiliary electrical power conversion device is higher than power conversion efficiency of the main electrical power conversion device within a load current range corresponding to a dark current flowing through the equipment.

2. The control apparatus according to claim 1, wherein
the equipment is defined as first equipment,
the power supply system is electrically connected to the main electrical storage device and includes second equipment having a load higher than that of the first equipment, and
when electrical power is not being supplied from the main electrical storage device to the second equipment, and it is not predicted that the first equipment will shift from the operation stopped state to the operating state, the supply control section sets the main electrical power conversion device to the operation stopped state.

3. The control apparatus according to claim 1, further comprising a main acquisition section that acquires a remaining capacity of the main electrical storage device, wherein
when the remaining capacity of the main electrical storage device falls below a main threshold, the supply control section sets an output voltage command value of the auxiliary electrical power conversion device to a value lower than output voltage of the auxiliary electrical storage device to stop electrical power supply from the auxiliary electrical power conversion device to the equipment.

4. The control apparatus according to claim 1, further comprising an auxiliary acquisition section that acquires a remaining capacity of the auxiliary electrical storage device, wherein when the remaining capacity of the auxiliary electrical storage device falls below an auxiliary threshold, the supply control section sets an output voltage command value of the auxiliary electrical power conversion device to a value higher than output voltage of the auxiliary electrical storage device to stop electrical power supply from the auxiliary electrical storage device to the equipment.

5. The control apparatus according to claim 1, wherein after it is predicted that the equipment will shift to the operating state, the supply control section stops electrical power supply from the auxiliary electrical power conversion device to the equipment when causing the main electrical power conversion device to supply electrical power to the equipment.

6. The control apparatus according to claim 1, wherein the power supply system is installed in a vehicle including a receiver that receives transmission waves transmitted from a portable device carried by a user, and the operation prediction section predicts that the equipment will shift to the operating state, when detecting a state where a distance between the portable device and the vehicle is a predetermined distance or less based on the transmission waves received by the receiver.

7. The control apparatus according to claim 6, wherein when detecting a state where the distance between the portable device and the vehicle is more than the predetermined distance based on a reception state of the transmission waves in the receiver, the operation prediction section predicts that the equipment will shift from the operating state to the operation stopped state, and if it is predicted that the equipment will shift to the operation stopped state, the supply control section stops electrical power supply from the main electrical power conversion device to the equipment.

8. The control apparatus according to claim 1, wherein the power supply system is installed in a vehicle including a locking device that switches between an unlocked state and a locked state of a vehicle door, and when the unlocked state is detected, the operation prediction section predicts that the equipment will shift to the operating state.

9. The control apparatus according to claim 8, wherein when the vehicle door is switched from the unlocked state to the locked state, the operation prediction section predicts that the equipment will shift from the operating state to the operation stopped state, and if it is predicted that the equipment will shift to the operation stopped state, the supply control section stops electrical power supply from the main electrical power conversion device to the equipment.

10. A control system, comprising:

the control apparatus according to claim 1; and the power supply system, wherein the equipment is defined as first equipment, the power supply system includes:

a main electrical power supply line;

second equipment that is electrically connected to the main electrical storage device through the main electrical power supply line and has a load higher than that of the first equipment; and a switching section that is provided to the main electrical power supply line and switches electrical connection between the main electrical storage device and the second equipment, and the main electrical power conversion device is connected to the main electrical power supply line at a position nearer to the main electrical storage device than the switching section is.

11. The control apparatus according to claim 10, further comprising:

an auxiliary electrical power supply line that electrically connects the main electrical power conversion device and the auxiliary electrical storage device; and an auxiliary line that electrically connects the auxiliary electrical power conversion device and the auxiliary electrical power supply line, wherein after it is predicted that the equipment will shift to the operating state, the supply control section stops electrical power supply from the auxiliary electrical power conversion device to the equipment when causing the main electrical power conversion device to supply electrical power to the equipment, and the control system further comprising a backflow prevention section that is provided to the auxiliary line and prevents current flow from the main electrical power conversion device to the auxiliary electrical power conversion device.

12. A control apparatus that is applied to a power supply system including a main electrical storage device, a main electrical power conversion device that decreases output voltage of the main electrical storage device and supplies the decreased output voltage to equipment, an auxiliary electrical power conversion device that has power conversion efficiency higher than that of the main electrical power conversion device in an operation stopped state of the equipment, and decreases output voltage of the main electrical storage device to supply the decreased output voltage to the equipment, and an auxiliary electrical storage device that is electrically connected with the main electrical power conversion device and the equipment and supplies electrical power to the equipment, the control apparatus comprising:

an operation prediction section that predicts that the equipment will shift from the operation stopped state to an operating state;

a supply control section that, if it is not predicted that the equipment will shift from the operation stopped state to the operating state, sets the main electrical power conversion device to the operation stopped state and operates the auxiliary electrical power conversion to supply electrical power from the auxiliary electrical power conversion device to the equipment, and that, if it is predicted that the equipment will shift from the operation stopped state to the operating state, operates the main electrical power conversion device to supply electrical power from the main electrical power conversion device to the equipment; and a main acquisition section that acquires a remaining capacity of the main electrical storage device, wherein when the remaining capacity of the main electrical storage device falls below a main threshold, the supply control section sets an output voltage command value of the auxiliary electrical power conversion device to a value lower than output voltage of the auxiliary electrical storage device to stop electrical power supply from the auxiliary electrical power conversion device to the equipment.

13. The control apparatus according to claim 12, further comprising an auxiliary acquisition section that acquires a remaining capacity of the auxiliary electrical storage device, wherein
when the remaining capacity of the auxiliary electrical storage device falls below an auxiliary threshold, the supply control section sets an output voltage command value of the auxiliary electrical power conversion device to a value higher than output voltage of the auxiliary electrical storage device to stop electrical power supply from the auxiliary electrical storage device to the equipment.

14. The control apparatus according to claim 12, wherein
the equipment is defined as first equipment,
the power supply system is electrically connected to the main electrical storage device and includes second equipment having a load higher than that of the first equipment, and
when electrical power is not being supplied from the main electrical storage device to the second equipment, and it is not predicted that the first equipment will shift from the operation stopped state to the operating state, the supply control section sets the main electrical power conversion device to the operation stopped state and operates the auxiliary electrical power conversion device to supply electrical power to the equipment.

15. The control apparatus according to claim 12, wherein
power conversion efficiency of the auxiliary electrical power conversion device is higher than power conversion efficiency of the main electrical power conversion device within a load current range corresponding to a dark current flowing through the equipment.

16. The control apparatus according to claim 12, wherein
after it is predicted that the equipment will shift to the operating state, the supply control section stops electrical power supply from the auxiliary electrical power conversion device to the equipment when causing the main electrical power conversion device to supply electrical power to the equipment.

17. The control apparatus according to claim 12, wherein
the power supply system is installed in a vehicle including a receiver that receives transmission waves transmitted from a portable device carried by a user, and
the operation prediction section predicts that the equipment will shift to the operating state, when detecting a state where a distance between the portable device and the vehicle is a predetermined distance or less based on the transmission waves received by the receiver.

18. The control apparatus according to claim 17, wherein
when detecting a state where the distance between the portable device and the vehicle is more than the predetermined distance, based on a reception state of the transmission waves in the receiver, the operation prediction section predicts that the equipment will shift from the operating state to the operation stopped state, and
if it is predicted that the equipment will shift to the operation stopped state, the supply control section stops electrical power supply from the main electrical power conversion device to the equipment and operates the auxiliary electrical power conversion device to supply electrical power to the equipment.

19. The control apparatus according to claim 12, wherein
the power supply system is installed in a vehicle including a locking device that switches between an unlocked state and a locked state of a vehicle door, and
when the unlocked state is detected, the operation prediction section predicts that the equipment will shift to the operation stopped state.

20. The control apparatus according to claim 19, wherein
when the vehicle door is switched from the unlocked state to the locked state, the operation prediction section predicts that the equipment will shift from the operating state to the operation stopped state, and
if it is predicted that the equipment will shift to the operation stopped state, the supply control section stops electrical power supply from the main electrical power conversion device to the equipment and operates the auxiliary electrical power conversion device to supply electrical power to the equipment.

21. A control system, comprising:
the control apparatus according to claim 12; and
the power supply system, wherein
the equipment is defined as first equipment,
the power supply system includes:
a main electrical power supply line;
second equipment that is electrically connected to the main electrical storage device through the main electrical power supply line and has a load higher than that of the first equipment; and
a switching section that is provided to the main electrical power supply line and switches electrical connection between the main electrical storage device and the second equipment, and
the main electrical power conversion device and the auxiliary electrical power conversion device are connected to the main electrical power supply line at positions nearer to the main electrical storage device than the switching section is.

22. A control system comprising:
a power supply system including:
a main electrical storage device, a main electrical power conversion device that decreases output voltage of the main electrical storage device and supplies the decreased output voltage to first equipment, an auxiliary electrical power conversion device that has power conversion efficiency higher than that of the main electrical power conversion device in an operation stopped state of the first equipment, and decreases output voltage of the main electrical storage device to supply the decreased output voltage to the first equipment, and an auxiliary electrical storage device that is electrically connected with the main electrical power conversion device and the first equipment and supplies electrical power to the first equipment; and
a control apparatus, wherein
the control apparatus comprises:
an operation prediction section that predicts that the first equipment will shift from the operation stopped state to an operating state; and
a supply control section that, if it is not predicted that the first equipment will shift from the operation stopped state to the operating state, sets the main electrical power conversion device to the operation stopped state and operates the auxiliary electrical power conversion to supply electrical power from the auxiliary electrical power conversion device to the first equipment, and that, if it is predicted that the first equipment will shift from the operation stopped state to the operating state, operates the main electrical power conversion device to supply electrical power from the main electrical power conversion device to the first equipment, after it is predicted that the first equipment will shift to the operating state, the supply control section stops electrical power supply from the auxiliary electrical power conversion device to the first equipment when causing the main electrical power conversion device to supply electrical power to the first equipment, the power supply system includes:

a main electrical power supply line;

second equipment that is electrically connected to the main electrical storage device through the main electrical power supply line and has a load higher than that of the first equipment;

a switching section that is provided to the main electrical power supply line and switches electrical connection between the main electrical storage device and the second equipment;

an auxiliary electrical power supply line that electrically connects the main electrical power conversion device and the auxiliary electrical storage device; and an auxiliary line that electrically connects the auxiliary electrical power conversion device and the auxiliary electrical power supply line, the main electrical power conversion device and the auxiliary electrical power conversion device are connected to the main electrical power supply line at positions nearer to the main electrical storage device than the switching section is, and the control system further comprises a backflow prevention section that is provided to the auxiliary line and prevents current flow from the main electrical power conversion device to the auxiliary electrical power conversion device.

23. A control apparatus that is applied to a power supply system including a main electrical storage device, a main electrical power conversion device that decreases output voltage of the main electrical storage device and supplies the decreased output voltage to equipment, an auxiliary electrical power conversion device that has power conversion efficiency higher than that of the main electrical power conversion device in an operation stopped state of the equipment, and decreases output voltage of the main electrical storage device to supply the decreased output voltage to the equipment, and an auxiliary electrical storage device that is electrically connected with the main electrical power conversion device and the equipment and supplies electrical power to the equipment, the control apparatus comprising:

an operation prediction section that predicts that the equipment will shift from the operation stopped state to an operating state;

a supply control section that, if it is not predicted that the equipment will shift from the operation stopped state to the operating state, sets the main electrical power conversion device to the operation stopped state and operates the auxiliary electrical power conversion to supply electrical power from the auxiliary electrical power conversion device to the equipment, and that, if it is predicted that the equipment will shift from the operation stopped state to the operating state, operates the main electrical power conversion device to supply electrical power from the main electrical power conversion device to the equipment; and an auxiliary acquisition section that acquires a remaining capacity of the auxiliary electrical storage device, wherein when the remaining capacity of the auxiliary electrical storage device falls below an auxiliary threshold, the supply control section sets an output voltage command value of the auxiliary electrical power conversion device to a value higher than output voltage of the auxiliary electrical storage device to stop electrical power supply from the auxiliary electrical storage device to the equipment.

* * * * *